(12) United States Patent
Veening

(10) Patent No.: US 11,326,261 B2
(45) Date of Patent: May 10, 2022

(54) ALKALINE AND CHLORINE SOLUTIONS PRODUCED USING ELECTRO-CHEMICAL ACTIVATION

(71) Applicant: Diversey, Inc., Charlotte, NC (US)

(72) Inventor: Jan E. Veening, Ijsselstein (NL)

(73) Assignee: DIVERSEY, INC., Fort Mill, SC (US)

( * ) Notice: Subject to any disclaimer, the term of this patent is extended or adjusted under 35 U.S.C. 154(b) by 158 days.

(21) Appl. No.: 16/302,208

(22) PCT Filed: May 5, 2017

(86) PCT No.: PCT/US2017/031264
§ 371 (c)(1),
(2) Date: Nov. 16, 2018

(87) PCT Pub. No.: WO2017/200772
PCT Pub. Date: Nov. 23, 2017

(65) Prior Publication Data
US 2019/0276940 A1    Sep. 12, 2019

Related U.S. Application Data

(60) Provisional application No. 62/421,419, filed on Nov. 14, 2016, provisional application No. 62/337,362, filed on May 17, 2016.

(51) Int. Cl.
*C25C 7/00* (2006.01)
*C25B 1/46* (2006.01)
(Continued)

(52) U.S. Cl.
CPC ............ *C25B 1/46* (2013.01); *A47L 15/4238* (2013.01); *C02F 1/4618* (2013.01);
(Continued)

(58) Field of Classification Search
CPC .... C25B 1/46; C25B 1/26; C25B 1/00; C25B 15/08; C25B 15/02; C25B 9/18;
(Continued)

(56) References Cited

U.S. PATENT DOCUMENTS 3,728,245 A    4/1973    Preis et al.
3,899,403 A    8/1975    Cook, Jr. et al.
(Continued)

FOREIGN PATENT DOCUMENTS

DE    19927227 A1 *   12/2000   .......... B01J 19/0086
EP    1916225            4/2008
(Continued)

OTHER PUBLICATIONS

International Search Report and Written Opinion for PCT/US2018/023499, dated Nov. 28, 2018, 10 pages.
(Continued)

*Primary Examiner* — Zulmariam Mendez
(74) *Attorney, Agent, or Firm* — Bell & Manning, LLC; N. Meredith Porembski

(57) ABSTRACT

An electro-chemical activation (ECA) system includes an anode chamber, a cathode chamber, and a neutralization chamber. The anode chamber includes an anode configured to convert water having an alkaline-metal chloride into an anodic electrolyte that includes hypochlorous acid. The cathode chamber includes a cathode configured to convert water into a cathodic electrolyte. The neutralization chamber includes a neutralization cathode configured to remove protons from the anodic electrolyte after it leaves the anode chamber. The ECA system is configured to recirculate the anodic electrolyte back through the anode chamber and the neutralization chamber at least one more time to produce a concentrated chlorine solution. The ECA system is further configured to recirculate the cathodic electrolyte back
(Continued)

through the cathode chamber at least one additional time to produce a concentrated alkaline solution.

19 Claims, 22 Drawing Sheets

(51) Int. Cl.
| | |
|---|---|
| *D06L 4/22* | (2017.01) |
| *A47L 15/42* | (2006.01) |
| *C02F 1/461* | (2006.01) |
| *C25B 15/02* | (2021.01) |
| *C25B 15/08* | (2006.01) |
| *D06F 35/00* | (2006.01) |
| *C25B 9/00* | (2021.01) |
| *C02F 1/467* | (2006.01) |
| *D06L 4/24* | (2017.01) |
| *C25B 9/19* | (2021.01) |
| *C25B 9/23* | (2021.01) |
| *C25B 9/70* | (2021.01) |
| *D06F 39/00* | (2020.01) |

(52) U.S. Cl.
CPC ............. *C02F 1/4674* (2013.01); *C25B 9/00* (2013.01); *C25B 9/19* (2021.01); *C25B 9/23* (2021.01); *C25B 9/70* (2021.01); *C25B 15/02* (2013.01); *C25B 15/08* (2013.01); *D06F 35/003* (2013.01); *D06L 4/22* (2017.01); *D06L 4/24* (2017.01); *A47L 2601/06* (2013.01); *C02F 2201/4615* (2013.01); *C02F 2201/46115* (2013.01); *C02F 2201/46125* (2013.01); *C02F 2201/46145* (2013.01); *C02F 2201/46185* (2013.01); *C02F 2209/06* (2013.01); *C02F 2307/12* (2013.01); *D06F 35/004* (2013.01); *D06F 39/007* (2013.01)

(58) Field of Classification Search
CPC .... C25B 1/14; C25B 9/00; C25B 9/08; C25B 1/10; C25B 1/265; C25C 7/00; C25C 7/005; C25C 7/06; C25C 7/02
See application file for complete search history.

(56) References Cited

U.S. PATENT DOCUMENTS

| | | | |
|---|---|---|---|
| 4,201,756 A | 5/1980 | Coe et al. | |
| 4,767,511 A | 8/1988 | Aragon | |
| 5,466,347 A | 11/1995 | Shimamum et al. | |
| 5,938,916 A | 8/1999 | Bryson et al. | |
| 5,997,717 A | 12/1999 | Miyashita et al. | |
| 6,228,251 B1 | 5/2001 | Okazaki | |
| 6,251,259 B1 | 6/2001 | Satoh et al. | |
| 6,547,947 B1 | 4/2003 | Uno et al. | |
| 7,238,272 B2 | 7/2007 | Sano | |
| 9,533,897 B2 | 1/2017 | Buitendag et al. | |
| 9,546,427 B2 | 1/2017 | Lumetta | |
| 2004/0124094 A1 | 7/2004 | Bo et al. | |
| 2006/0088498 A1 | 4/2006 | Martin et al. | |
| 2010/0065421 A1 | 3/2010 | Bohnstedt | |
| 2010/0078331 A1 | 4/2010 | Scherson et al. | |
| 2012/0085658 A1 | 4/2012 | Bhavaraju et al. | |
| 2012/0145537 A1 | 6/2012 | Kuiphoff | |
| 2013/0341200 A1 | 1/2013 | McCormick et al. | |
| 2013/0146473 A1 | 6/2013 | Lambert et al. | |
| 2013/0168260 A1 | 7/2013 | Scherson et al. | |
| 2014/0014145 A1 | 1/2014 | Xia et al. | |
| 2014/0124377 A1 | 5/2014 | Joynt | |
| 2014/0246308 A1 | 9/2014 | Lim | |
| 2016/0194770 A1 | 7/2016 | Yokota et al. | |
| 2017/0042160 A1 | 2/2017 | Muramoto et al. | |
| 2017/0217799 A1 | 8/2017 | Hanaoka | |
| 2017/0298552 A1 | 10/2017 | Arai et al. | |
| 2017/0314179 A1 | 11/2017 | Arai et al. | |
| 2018/0135190 A1 | 5/2018 | Gohda | |
| 2019/0368059 A1 | 12/2019 | Veening et al. | |

FOREIGN PATENT DOCUMENTS

| | | |
|---|---|---|
| EP | 2172581 | 4/2010 |
| EP | 2191721 | 6/2010 |
| JP | H0852475 | 2/1996 |
| JP | H09122653 | 5/1997 |
| JP | H11235590 | 8/1999 |
| JP | 2002210466 | 7/2002 |
| JP | 2015211928 | 11/2015 |
| WO | WO01/42143 | 6/2001 |
| WO | WO 2014/064571 | 5/2014 |
| WO | WO2014/102636 | 7/2014 |

OTHER PUBLICATIONS

International Search Report and Written Opinion for PCT/US2017/031264, dated Jul. 24, 2017, 12 pages.
Notice of Reasons for Refusal issued on Japanese Application No. 2019-513739, dated Jan. 22, 2021, English translation only.
Communication issued on EP Application 17727751.4, dated Feb. 4, 2021.
Decision to Grant a Patent issued for Japanese Application 2019-513739, dated Oct. 5, 2021.

\* cited by examiner

ALKALINE AND CHLORINE SOLUTIONS PRODUCED USING ELECTRO-CHEMICAL ACTIVATION

CROSS REFERENCE TO RELATED APPLICATIONS

This application is a National Stage of International Application No. PCT/US2017/031264 that was filed May 5, 2017, the entire contents of which are herein incorporated by reference; which claims priority to U.S. Patent Application No. 62/337,362 that was filed May 17, 2016 and U.S. Patent Application No. 62/421,419 that was filed Nov. 14, 2016, the entire contents of both of which are herein incorporated by reference.

BACKGROUND

The present disclosure is in the technical field of alkaline and chlorine solutions production. More particularly, the present disclosure is directed to production of highly-concentrated alkaline solutions and highly-concentrated, pH-neutral chlorine solutions using electro-chemical activation.

Chlorine and alkaline solutions are used as cleaning solutions, particularly by washing machines (e.g., commercial washing machines). Stocking chlorine and alkaline solutions for use by washing machine is possible. However, shipping chlorine and alkaline solutions and maintaining an inventory of chlorine and alkaline solutions can be expensive and use valuable resources (e.g., inventory space). Some attempts have been made to produce chlorine and alkaline solutions on demand. For example, some electro-chemical activation (ECA) systems have been developed to produce chlorine and alkaline solutions. However, these existing ECA systems produce dilute chlorine and alkaline solutions, with chlorine concentration less than 0.02% and alkalinity less than 0.02% $Na_2O$ at low flow rates. Such dilute chlorine and alkaline solutions are unable to maintain detergent concentration at a desired level because of detergent dilution by fresh water intake by the machine.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one embodiment, an electro-chemical activation (ECA) system includes an anode chamber that includes an anode, a cathode chamber that includes a cathode, and a neutralization chamber that includes a neutralization cathode. The anode is configured to convert water having an alkaline-metal chloride into an anodic electrolyte that includes hypochlorous acid. The cathode is configured to convert water into a cathodic electrolyte. The neutralization cathode is configured to remove protons from the anodic electrolyte after it leaves the anode chamber. The ECA system is configured to recirculate the anodic electrolyte back through the anode chamber and the neutralization chamber at least one more time to produce a concentrated chlorine solution. The ECA system is further configured to recirculate the cathodic electrolyte back through the cathode chamber at least one additional time to produce a concentrated alkaline solution.

In one example, the ECA system further includes a chamber cell, where the anode chamber and the cathode chamber are located in the chamber cell, and where a first membrane is located in the chamber cell between the anode chamber and the cathode chamber. In another example, the first membrane is configured to hinder the migration of $Cl^-$ between the anode chamber and the cathode chamber. In another example, the cathode is located in the cathode chamber in direct contact with the first membrane. In another example, the neutralization chamber is located in the chamber cell and a second membrane is located in the chamber cell between the anode chamber and the neutralization chamber. In another example, the second membrane is configured to hinder the migration of $Cl^-$ between the anode chamber and the neutralization chamber. In another example, the ECA system further includes a neutralization cell that is separate from the chamber cell, where the neutralization chamber is located in the neutralization cell. In another example, the ECA system further includes a neutralization anode located at least partially in the neutralization chamber. In another example, a ratio exposed surface area of the neutralization anode in the neutralization chamber to exposed surface area of the neutralization cathode in the neutralization chamber is in a range from about 1:1 to about 1:10,000.

In another example, the ECA system further includes a brine chamber located in the chamber cell between the anode chamber and the cathode chamber. In another example, the brine chamber and the cathode chamber are separated by the first membrane and the brine chamber and the anode chamber are separated by a second membrane. In another example, the second membrane is configured to permit migration of $Cl^-$ from the brine chamber to the anode chamber the anode chamber. In another example, the second membrane is further configured to hinder the migration of sodium between the brine chamber and the anode chamber. In another example, the ECA system is configured to cycle brine through the brine chamber.

In another example, the concentrated chlorine solution has a pH level in a range from about pH 4 to about pH 6. In another example, the concentrated chlorine solution has a concentration in a range from about 0.02% to about 14%. In another example, the ECA system is configured to dispense the concentrated chlorine solution to a washing machine, and the washing machine is configured to dilute the concentrated chlorine solution from the range from about 0.02% to about 14% to a range from about 15 ppm to about 60 ppm. In another example, the ECA system is configured to dilute the concentrated chlorine solution from the range from about 0.02% to about 14% to a range from about 200 ppm to about 1,200 ppm prior to dispensing the concentrated chlorine solution. In another example, the chlorine solution has a concentration in a range from about 3% to about 6%. In another example, the concentrated alkaline solution has an alkalinity in a range from about 0.02% $Na_2O$ to about 50% $Na_2O$. In another example, the concentrated alkaline solution has an alkalinity in a range from about 3% $Na_2O$ to about 6% $Na_2O$.

In another example, the ECA system further includes an electronic controller configured to receive an indication of a pH level of the anodic electrolyte and further configured to control one or more of power to or activation time of the cathode and the neutralization cathode based on the indication of the pH level of the anodic electrolyte. In another example, the electronic controller is further configured to control one or more of recirculation of the anodic electrolyte by the ECA system, recirculation of the alkaline solution by the ECA system, dispensing of the concentrated chlorine solution from the ECA system, or dispensing of the concentrated alkaline solution from the ECA system.

In another embodiment, a method includes adding brine to an electro-chemical activation (ECA) system; adding water to the ECA system; circulating the brine through an anode chamber and a neutralization chamber multiple times; and circulating the water through the cathode chamber multiple times. The anode chamber includes an anode configured to convert water having an alkaline-metal chloride into an anodic electrolyte that includes hypochlorous acid. Circulating the brine through the anode chamber and the neutralization chamber multiple times causes the brine to be converted into concentrated chlorine solution having a pH level in a range from about pH 4 to about pH 8. The cathode chamber includes a cathode configured to convert water into an alkaline solution. The circulating the water through the cathode chamber multiple times causes the water to be converted into concentrated alkaline solution. The anode chamber and the cathode chamber are located in a chamber cell having a membrane located between the anode chamber and the cathode chamber, and the membrane is configured to hinder the migration of $Cl^-$ between the anode chamber and the cathode chamber.

In another embodiment, an electro-chemical activation (ECA) system includes an anode chamber that includes an anode, a cathode chamber that includes a cathode, and a neutralization chamber that includes a neutralization cathode. The anode is configured to convert water having an alkaline-metal chloride into an anodic electrolyte that includes hypochlorous acid. The cathode is configured to convert water into a cathodic electrolyte, and the cathodic electrolyte forms at least a portion of an alkaline solution. The neutralization cathode is configured to remove protons from the anodic electrolyte after it leaves the anode chamber. The anodic electrolyte, after it passes through the neutralization chamber, forms at least a portion of a chlorine solution. The ECA system is configured to separately dispense the alkaline solution and the chlorine solution.

In one example, the ECA system further includes a neutralization recirculation path configured to recirculate at least a portion of the anodic electrolyte back through the neutralization chamber. In another example, the ECA system further includes a chlorine solution tank configured to receive the anodic electrolyte from the neutralization chamber. In another example, the neutralization recirculation path is configured to carry anodic electrolyte from the chlorine solution tank back to the neutralization chamber.

In another embodiment, a method is used to operating an electro-chemical activation (ECA) system. The ECA system includes an anode chamber that includes an anode configured to convert water having an alkaline-metal chloride into an anodic electrolyte, a cathode chamber that includes a cathode configured to convert water into a cathodic electrolyte, and a neutralization chamber that includes a neutralization cathode configured to remove protons from the anodic electrolyte after it leaves the anode chamber. The ECA system is configured to recirculate the anodic electrolyte back through the anode chamber and the neutralization chamber at least one more time to produce a concentrated chlorine solution. The method includes operating the ECA system in a production mode and operating the ECA system in a neutralization mode. In the production mode, the cathode and the neutralization cathode are powered on and the ECA system causes a decrease in a pH level of the anodic electrolyte. In the neutralization mode, the cathode is powered off, the neutralization cathode is powered on, and the ECA system cases an increase in the pH level of the anodic electrolyte. The method further includes controlling operation of the ECA system in the production mode and the neutralization mode to cause the pH level of the anodic electrolyte to remain at or above about pH 4.0.

In one example, the method further includes alternating operation of the ECA system between the production mode and the neutralization mode a plurality of times. In another example, the method further includes controlling the alternating operation of the ECA system between the production mode and the neutralization mode so that the pH level of the anodic electrolyte remains within a range between about 4.0 pH and about 7.0 pH during the alternating operation of the ECA system.

BRIEF DESCRIPTION OF THE DRAWING

The foregoing aspects and many of the attendant advantages of the disclosed subject matter will become more readily appreciated as the same become better understood by reference to the following detailed description, when taken in conjunction with the accompanying drawings, wherein.

DETAILED DESCRIPTION

The present disclosure describes embodiments of using electro-chemical activation (ECA) to produce highly-concentrated alkaline solutions and highly-concentrated, pH-neutral chlorine solutions. For purposes of this disclosure, "pH-neutral" refers to a substance having a pH level in a range from about pH 6 to about pH 8. In some embodiments, highly-concentrated alkaline solutions have an alkalinity greater than or equal to about 0.02% $Na_2O$ and highly-concentrated chlorine solutions have chlorine concentration of equal to or more than about 0.02%.

As discussed above, existing ECA systems have been able to produce dilute chlorine and alkaline solutions, with chlorine concentration less than about 0.02% and alkalinity less than about 0.02% $Na_2O$. However, these dilute chlorine and alkaline solutions are insufficient for particular washing scenarios. In particular, such dilute chlorine and alkaline solutions are unable to maintain detergent concentration at a desired level in a (ware) washing machine because of detergent dilution by fresh water intake by the machine. What is needed is an on-demand solution for producing highly-concentrated alkaline solutions and highly-concentrated, pH-neutral chlorine solutions.

Describe herein are embodiments of ECA systems that enable on-demand creation of pH-neutral chlorine solutions and alkaline solutions which can be used for washing machines (e.g., commercial dish washing machines and commercial ware washing machines and laundry machines). Such chlorine solutions and alkaline solutions can be produced during machine downtime (e.g., during the night). The ECA systems disclosed herein are able to dose concentrated detergent solutions and therefore create and maintain correct/desired product concentrations resulting in a good cleaning performance, throughout the washing process. In some embodiments, the concentrated alkaline solutions created by the ECA systems explained have an alkalinity ranging from about 0.02% $Na_2O$ to about 50% $Na_2O$ and the concentrated and neutral chlorine solutions have an active chlorine concentrate ranging from about 0.02% to about 14%.

Figure 1:
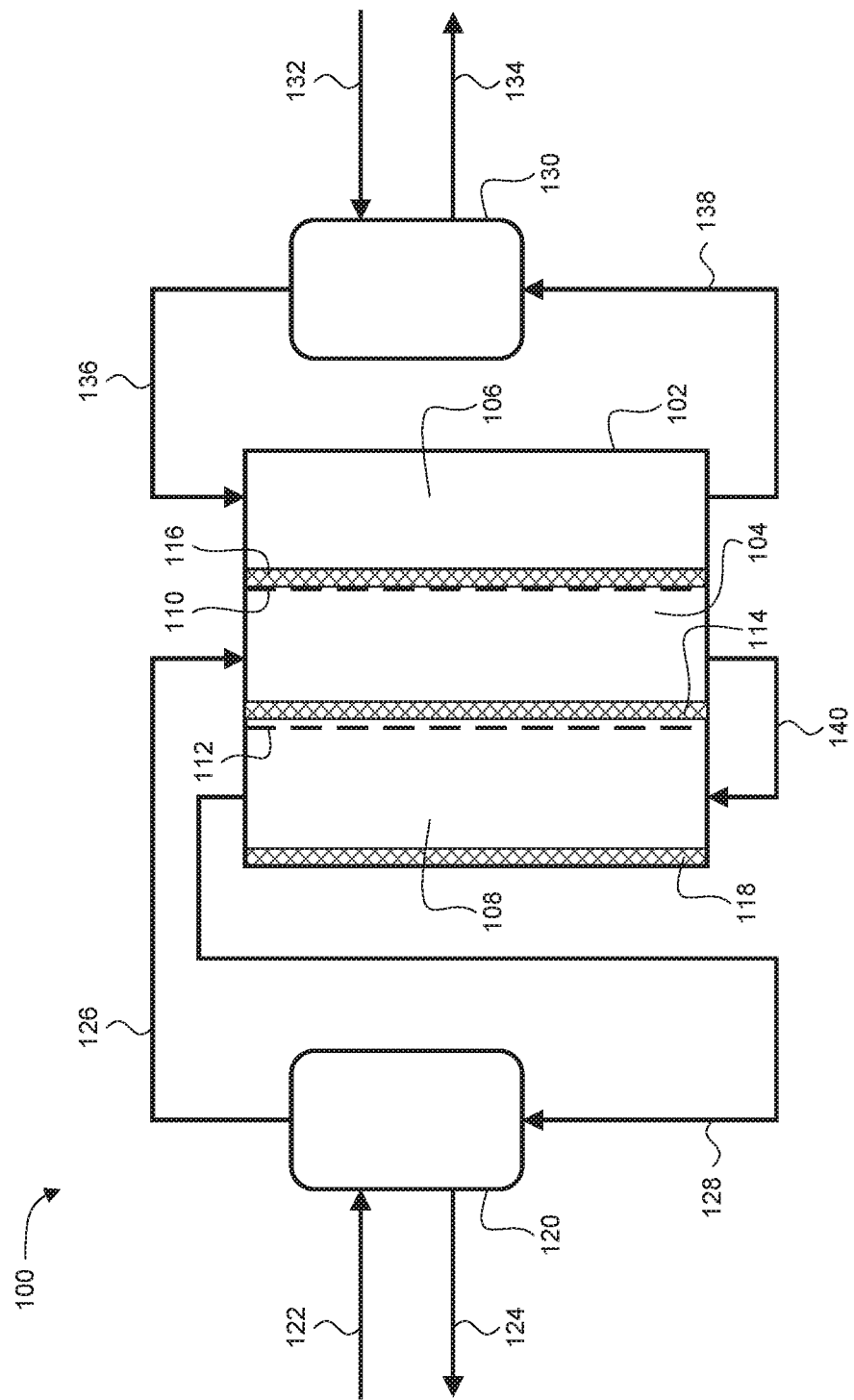
FIG. 1 depicts an embodiment of an ECA system configured to produce highly-concentrated alkaline solutions and highly-concentrated, pH-neutral chlorine solutions, in accordance with the embodiments disclosed herein.

Depicted in FIG. 1 is an embodiment of an ECA system 100 configured to produce highly-concentrated alkaline solutions and highly-concentrated, pH-neutral chlorine solutions. The ECA system 100 includes a chamber cell 102 that includes an anode chamber 104, a cathode chamber 106, and a neutralization chamber 108. The anode chamber 104 is separated from the cathode chamber 106 by a first membrane 110 and the anode chamber 104 is separated from the neutralization chamber 108 by a second membrane 112. In some embodiments, the first and second membranes 110 and 112 are cation exchange membranes or bipolar membranes. In some embodiments, the first and second membranes are configured to hinder the migration of $Cl^-$, while permitting electrolysis to be performed by an anode and a cathode on either side of the membrane.

The anode chamber 104 includes an anode 114. In some embodiment, the anode 114 is solid, porous, or meshed electrode. In some embodiments, the anode 114 is made from titanium with a titanium oxide coating an iridium (oxide) coating or a dimensionally stable anodes-Cl (DSA-Cl) type coating. In some embodiments, the anode 114 is made from graphite. In the depicted embodiment, the anode 114 is placed in the anode chamber 104 near or in contact with the second membrane 112. In other embodiments, the anode 114 is placed in the anode chamber 104 at a position between the location shown in FIG. 1 and a location near the center of the anode chamber 104.

The cathode chamber 106 includes a cathode 116. In some embodiments, the cathode 116 is a porous or meshed electrode. In some embodiments, the cathode 116 is made from titanium. In some embodiments, the cathode 116 is made from graphite. In some embodiments, as shown in FIG. 1, the cathode 116 is placed in the cathode chamber 106 near or in direct contact with the first membrane 110.

The neutralization chamber 108 includes a neutralization cathode 118. In some embodiments, the neutralization cathode 118 is a solid, porous or meshed electrode. In some embodiments, the neutralization cathode 118 is made from titanium with a titanium oxide coating or an iridium(oxide) coating or a DSA-Cl type of coating. In some embodiments, the neutralization cathode 118 is made from graphite. In some embodiments, as shown in FIG. 1, the neutralization cathode 118 is placed in the neutralization chamber 108 near a side of the neutralization chamber 108 that is opposite of the second membrane 112.

The ECA system 100 also includes a chlorine solution tank 120. A brine supply line 122 is configured to carry brine from an external source (e.g., a brine tank) into the chlorine solution tank 120. A chlorine solution supply line 124 is configured to carry chlorine solution out of the chlorine solution tank 120 to an external destination (e.g., a washing machine). An anode chamber supply line 126 is configured to carry fluid out of the chlorine solution tank 120 to the anode chamber 104. In some embodiments, the fluid carried by anode chamber supply line 126 is brine, anodic electrolyte, water, any other fluid, or any combination thereof.

A neutralization supply line 140 is configured to carry anodic electrolyte out of the anode chamber 104 to the neutralization chamber 108. In some embodiments, such as the embodiment shown in FIG. 1, the neutralization supply line 140 is configured to carry anodic electrolyte out of the anode chamber 104 from a side of the anode chamber 104 that is opposite of the side of the anode chamber 104 into which the anode chamber supply line 126 carries fluid into the anode chamber 104. An anode return line 128 is configured to carry anodic electrolyte out of the neutralization chamber 108 back to the chlorine solution tank 120. In some embodiments, such as the embodiment shown in FIG. 1, the anode return line 128 is configured to carry anodic electrolyte out of the neutralization chamber 108 from a side of the neutralization chamber 108 that is opposite of the side of the neutralization chamber 108 into which the neutralization supply line 140 carries anodic electrolyte into the neutralization chamber 108.

The ECA system 100 also includes an alkaline solution tank 130. A water supply line 132 is configured to carry raw or softened water from an external source (e.g., a water tank) into the alkaline solution tank 130. An alkaline solution supply line 134 is configured to carry alkaline solution out of the alkaline solution tank 130 to an external destination (e.g., a washing machine/tap). A cathode chamber supply line 136 is configured to carry fluid out of the alkaline solution tank 130 to the cathode chamber 106. In some embodiments, the fluid carried by the cathode chamber supply line 136 is cathodic electrolyte, water, any other fluid, or any combination thereof. A cathode return line 138 is configured to carry cathodic electrolyte out of the cathode chamber 106 back to the alkaline solution tank 130. In some embodiments, such as the embodiment shown in FIG. 1, the cathode return line 138 is configured to carry cathodic electrolyte out of the cathode chamber 106 from a side of the cathode chamber 106 that is opposite of the side of the cathode chamber 106 into which the cathode chamber supply line 136 carries fluid into the cathode chamber 106.

Figure 2:
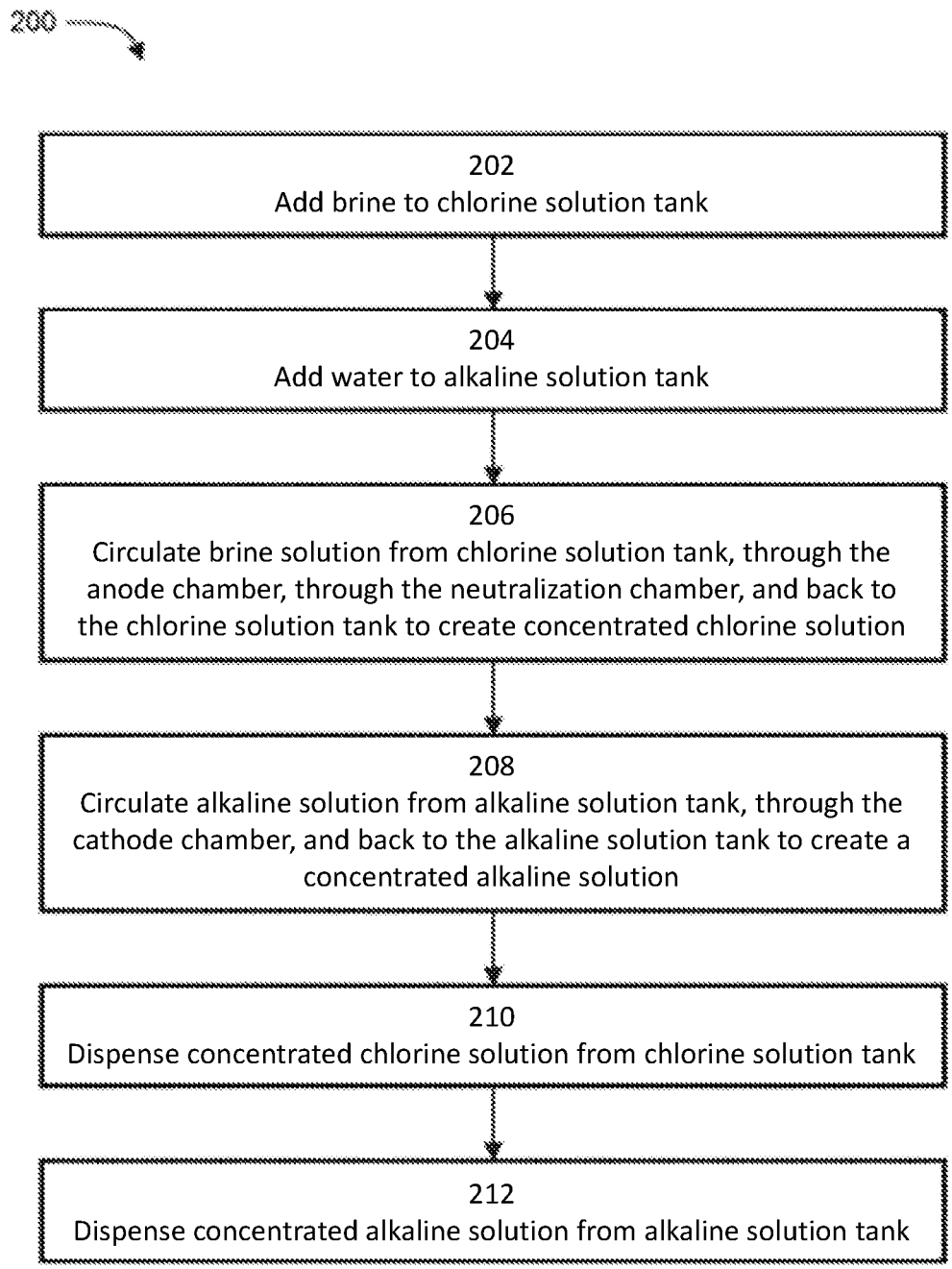
FIG. 2 depicts an embodiment of a method of using the ECA system depicted in FIG. 1, in accordance with the embodiments disclosed herein.
Figure 3A:
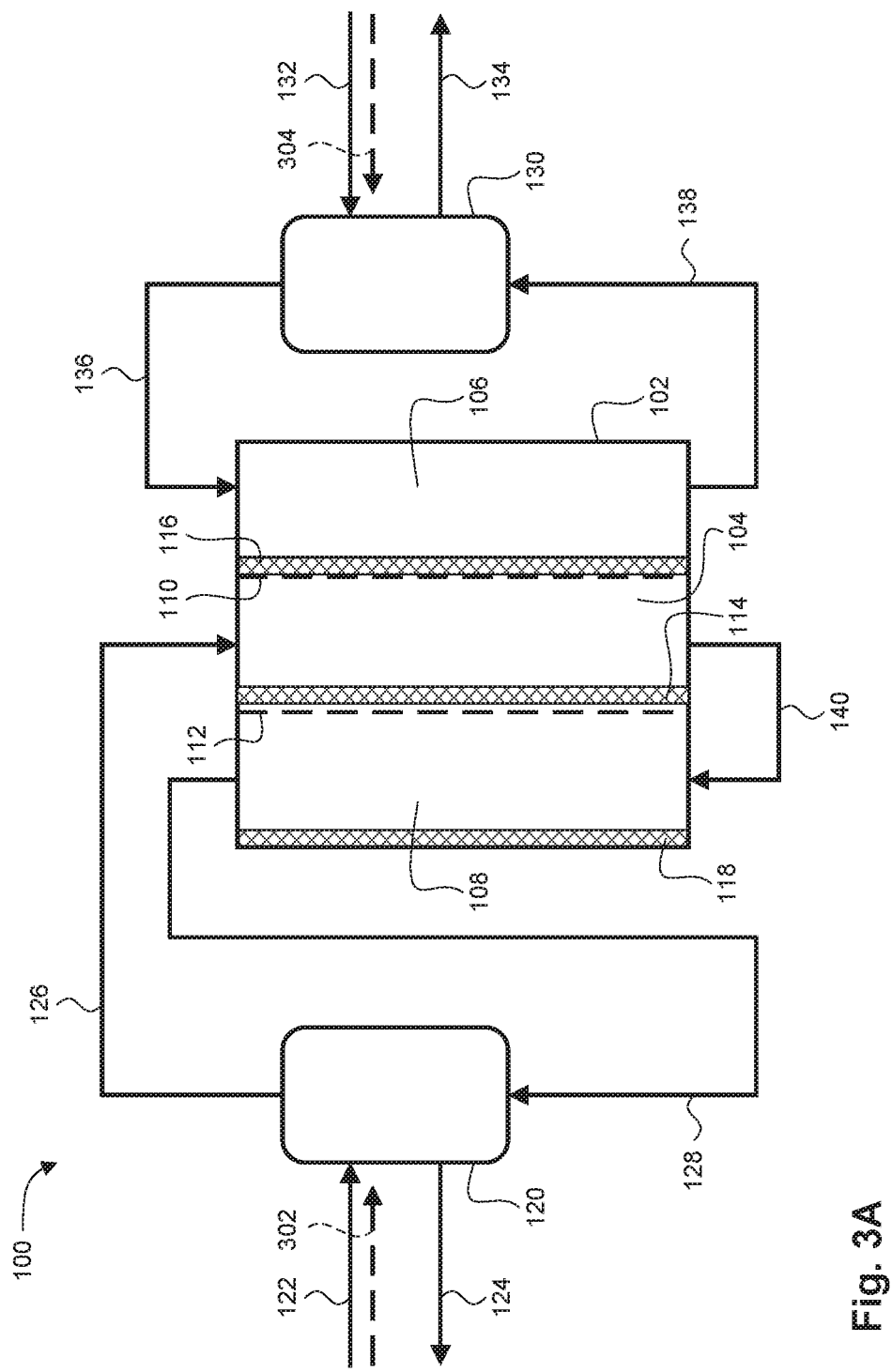
FIGS. 3A-3C depict examples of flows of fluids through the ECA system depicted in FIG. 1 to perform the method depicted in FIG. 2, in accordance with the embodiments disclosed herein.
Figure 3B:
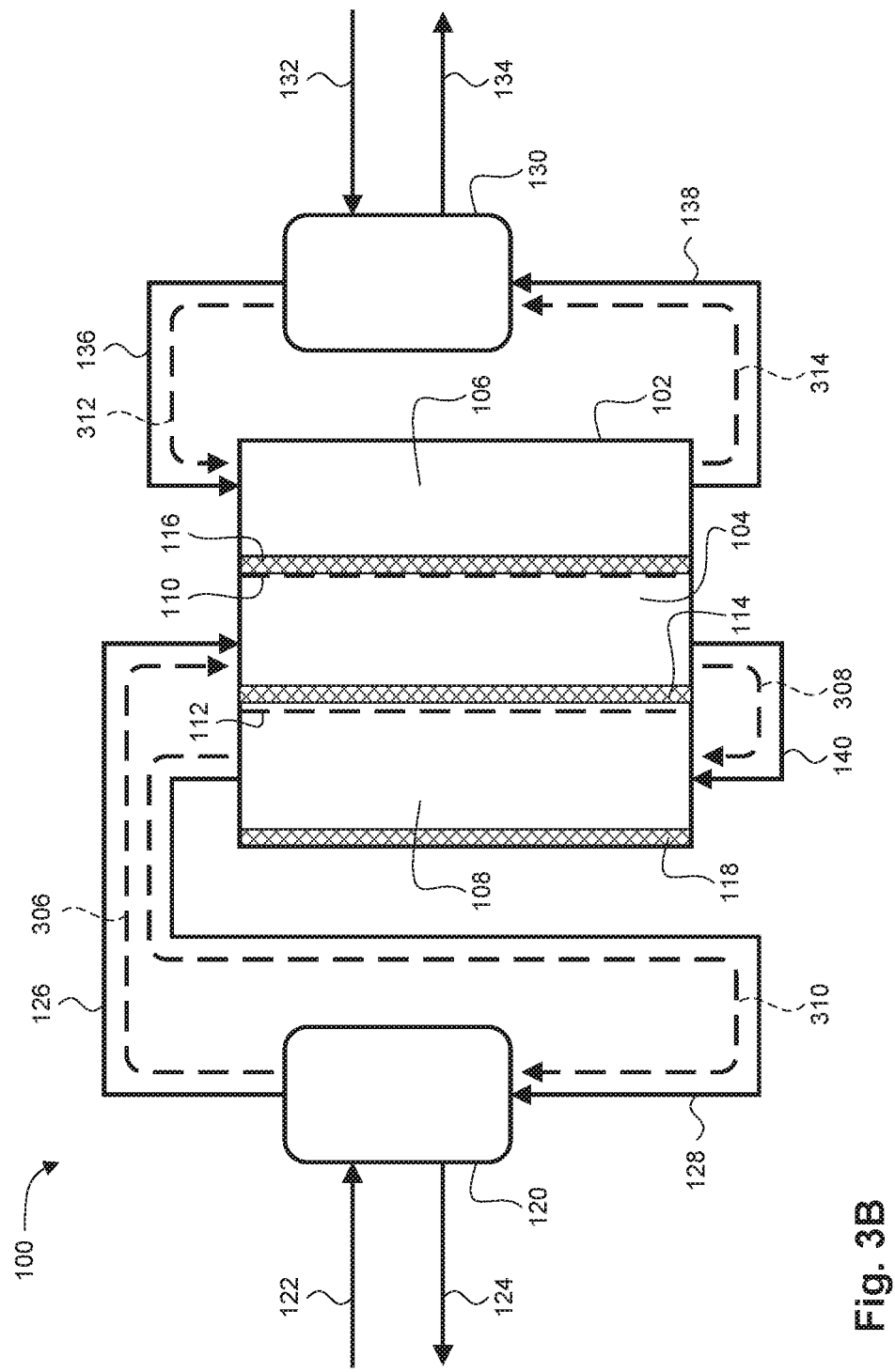
Figure 3C:
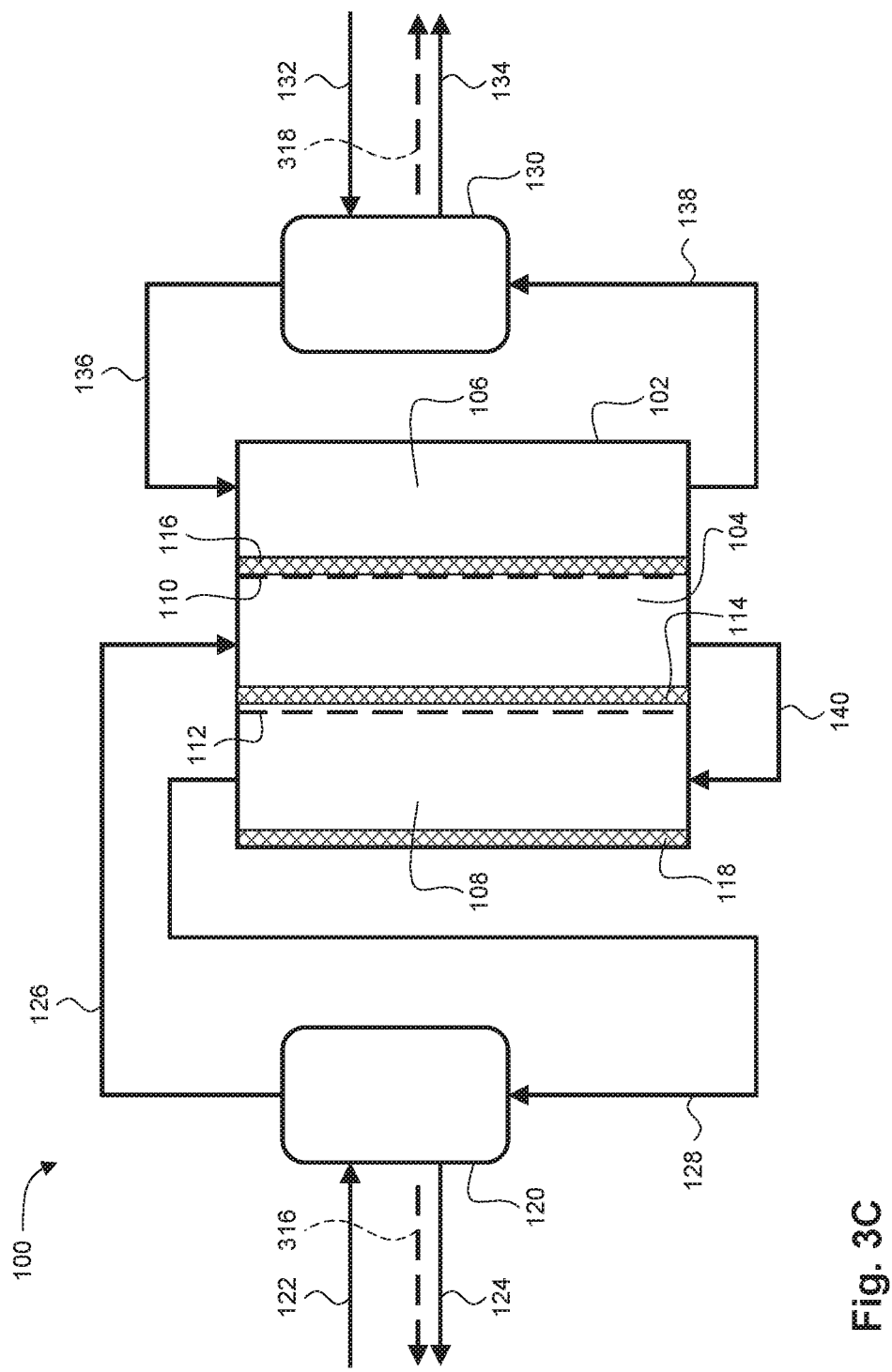

The ECA system 100 can be used to create concentrated cleaning solutions, such as to produce concentrated chlorine solution and concentrated alkaline solution for commercial dishwashing machines. Depicted in FIG. 2 is an embodiment of a method 200 of using the ECA system 100. Various steps of the method 200 are also represented in FIGS. 3A-3C using dashed arrows to include flows of solutions or other fluids.

At box 202, brine is added to the chlorine solution tank. In the embodiment shown in FIG. 3A, a brine flow 302 passes through the brine supply line 122 into the chlorine solution tank 120. Adding brine to the chlorine solution tank 120 is sometimes referred to as "charging" the chlorine solution tank 120. In some embodiments, the brine is raw water (i.e., untreated water) or soft water (i.e., water with a low ion concentration) that has an alkaline-metal chloride. In some examples, the alkaline-metal chloride has a concentration in a range from about 0.25% to about 40%.

At box 204, water is added to the alkaline solution tank. In the embodiment shown in FIG. 3A, a water flow 304 passes through the water supply line 132. Adding water to the alkaline solution tank 130 is sometimes referred to as "charging" the alkaline solution tank 130. In some embodiments, the water is raw water (i.e., untreated water) or soft water (i.e., water with low ion concentration) that is free from alkaline-metal chloride and water hardness salts.

At block 206, the brine solution is circulated to create a concentrated chlorine solution. In the embodiment shown in FIG. 3B, the circulation includes a first flow 306 of fluid from the chlorine solution tank 120 to the anode chamber 104 via the anode chamber supply line 126, a second flow 308 of anodic electrolyte from the anode chamber 104 to the neutralization chamber 108 via the neutralization supply line 140, and a third flow 310 of anodic electrolyte from the neutralization chamber 108 back to the chlorine solution tank 120 via the anode return line 128.

An electrolysis process occurs by applying a voltage between the anode 114 and either or both of the cathode 116 and the neutralization cathode 118. As previously noted, in some embodiments, the brine has an alkaline-metal chloride with a concentration in a range from about 0.25% to about 40%. As the brine passes through the anode chamber 104, the active (i.e., powered) anode 114 causes some of the water with alkaline-metal chloride to be converted to hypochlorous acid according to the following anode half-cell reaction:

$$Cl^- + H_2O \rightarrow OCl^- + 2H^+ + 2e^- \quad (Eo\ 1.45V) \quad (1)$$

Because not all of the water and alkaline-metal chloride is converted to hypochlorous acid, the result of passing brine through the anode chamber is an anodic electrolyte containing water, alkaline-metal chloride, and hypochlorous acid.

The concentration of the hypochlorous acid in the anodic electrolyte after one pass through the anode chamber 104 may not be as high as desired for particular cleaning solutions. In some examples, commercial washing machines may use highly-concentrated cleaning solutions, particularly when commercial washing machines add fresh water to dilute the cleaning solution as part of the washing process. In some embodiments, in order to raise the concentration of the hypochlorous acid in the anodic electrolyte, the anodic electrolyte is circulated through the anode chamber 104 multiple times to create more hypochlorous acid in the anodic electrolyte until a concentrated chlorine solution is formed.

In some embodiments, the recirculation continues until the concentrated chlorine solution reaches a predetermined active chlorine concentration. In some examples, the predetermined active chlorine concentration is in a range from about 0.02% to about 14%. In some embodiments, the concentration of active chlorine used in (ware) washing machines are in the range of about 15 ppm to about 60 ppm, and the (ware) washing machines are configured to receive concentrated chlorine solution in a range from about 0.02% to about 14% and to dilute the concentrated chlorine solution to the use range from about 15 ppm to about 60 ppm. In other embodiments, the recirculation continues until the concentrated chlorine solution has been circulated a predetermined number of times. In some examples, the predetermined number of times is in a range from about two times to about 10,000 times. In this way, the ECA system 100 creates a concentrated chlorine solution by circulating the anodic electrolyte until the concentration of the chlorine solution reaches a particular concentration. In some embodiments, the predetermined active chlorine concentration is in a range from about 0.02% to about 14%, in a range from about 0.02% to about 10%, or in a range from about 0.02% to about 5%.

Figure 4:
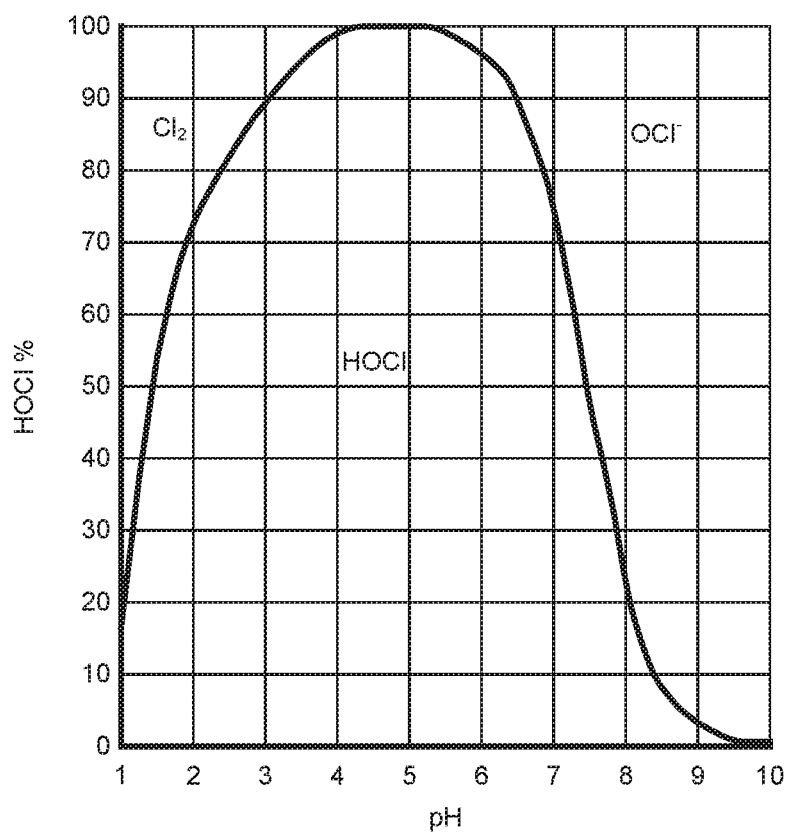
FIG. 4 depicts a chart showing percentages of HOCl based on pH level.

One possible issue with recirculating anodic electrolyte to create concentrated chlorine solution is that the reaction in the anode chamber 104 forms protons. The protons increase acidity of the anodic electrolyte and a resulting drop in pH of the anodic electrolyte. As shown in the chart in FIG. 4, chlorine gas ($Cl_2$) may form at low pH values, typically in a range below about pH 4. The formation of chlorine gas creates a safety issue as chlorine gas is harmful to users of (ware) washing machines and cleaning personnel. Thus, in order to avoid the creation of chlorine gas, the pH level of the anodic electrolyte should be kept above about pH 4.

In order to avoid a pH drop below pH 4, the circulating anodic electrolyte is passed through the neutralization chamber 108 after it leaves the anode chamber 104. The neutralization chamber 108 includes a cathode 118 that, when operating in connection with anode 114, removes protons from the anodic electrolyte. The neutralization effect occurs as a result of the half reaction according to the following chemical reaction:

$$2H^+ + 2e^- \rightarrow H_2 \quad (Eo(V)\ +0.00) \quad (2)$$

In some embodiments, the neutralization cathode 118 is powered in a range of about 10% to about 100% of the operation time of the cell 102. In some embodiments, the neutralization cathode 118 is powered in a range from about 10% to about 100% of a maximum operating power of the cell 102. In some embodiments, the neutralization chamber 108 is operated such that the anodic electrolyte remains pH-neutral (i.e., having a pH level in a range from about pH 6 to about pH 8). In some embodiments, the neutralization chamber 108 is operated such that the anodic electrolyte remains at a pH level in a range from about pH 4 to about pH 7.

At block 208, the water is circulated to create a concentrated alkaline solution. In the embodiment shown in FIG. 3B, the circulation includes a first flow 312 of fluid from the alkaline solution tank 130 to the cathode chamber 106 via the cathode chamber supply line 136 and a second flow 314 of cathodic electrolyte from the cathode chamber 106 back to the alkaline solution tank 130 via the cathode return line 138. As the water passes through the cathode chamber 106 during the electrolysis process, the active (i.e., powered) cathode 116 causes some of the water to be converted to an alkaline electrolyte according to the following cathode half-cell reaction:

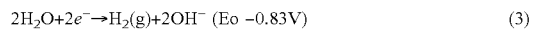

$$2H_2O + 2e^- \rightarrow H_2(g) + 2OH^- \quad (Eo\ -0.83V) \quad (3)$$

The concentration of the alkaline electrolyte after one pass through the cathode chamber 106 may not be as high as desired for particular cleaning machines. In some examples, commercial washing machines may use highly-concentrated cleaning solutions. In some embodiments, in order to raise the concentration of the alkaline electrolyte, the alkaline electrolyte is circulated through the cathode chamber 106 multiple times to create a concentrated alkaline solution. In some embodiments, the recirculation continues until the concentrated alkaline solution reaches a predetermined alkalinity. In some examples, the predetermined alkalinity is in a range from about 0.02% $Na_2O$ to about 50% $Na_2O$. In some embodiments, (ware) washing machines wash with alkalinity levels in the range from about 50 ppm $Na_2O$ to about 400 ppm $Na_2O$, and the (ware) washing machines are configured to receive concentrated alkaline solution in a range from about 0.02% $Na_2O$ to about 50% $Na_2O$ and to dilute the concentrated alkaline solution to the use range from about 50 ppm $Na_2O$ to about 400 ppm $Na_2O$. In other embodiments, the recirculation continues until the concentrated alkaline solution has been circulated a predetermined number of times. In some examples, the predetermined number of times is in a range from about two times to about 10,000 times. In this way, the ECA system 100 creates a concentrated alkaline solution by circulating the alkaline electrolyte until the alkalinity of the alkaline solution reaches a particular concentration. In some examples, the predetermined alkalinity is in a range from about 0.02% $Na_2O$ to about 50% $Na_2O$, in a range from about 0.02% $Na_2O$ to about 10% $Na_2O$, or in a range from about 0.02% $Na_2O$ to about 5% $Na_2O$.

In some embodiments, the cathode 116 is powered in a range of about 10% to about 100% of the operation time of the cell 102. In some embodiments, the cathode 116 is powered in a range from about 10% to about 100% of a maximum operating power of the cell 102.

The circulation of the anodic electrolyte and the cathodic electrolyte may be performed at least partially simultaneously. This allows both the concentrated chlorine solution and the concentrated alkaline solution to be created at least partially simultaneously. In some embodiments, while both the cathode 116 and the neutralization cathode 118 are operating during simultaneous creation of the concentrated chlorine solution and the concentrated alkaline, the reaction caused by the neutralization cathode 118 may not remove enough protons from the anodic electrolyte to maintain the pH level in a safe range (e.g., above about pH 4). In some embodiments, the pH level of the anodic electrolyte is monitored. As the pH level drops to a predetermined level (e.g., below pH 5), the operation of the cathode 116 is reduced or discontinued so that operation of the neutralization cathode 118 is increased to raise the pH level of the anodic electrolyte. As the pH level returns to a safe level (e.g., to a point in a range from about pH 6 to about pH 8), the operation of the cathode 116 is resumed to continue increasing the alkalinity of the alkaline solution.

In some embodiments, an electronic controller (e.g., a computing device) is configured to monitor conditions in the ECA system 100 and to control operation of particular components of the ECA system 100. In one example, the electronic controller is configured to receive signals from one or more pH sensors configured to provide an indication of the pH level of the anodic electrolyte and to control the power level and/or operating time at which the cathode 116 and the neutralization cathode 118 operate based on the pH level of the anodic electrolyte. In other embodiments, the electronic controller controls one or more valves that direct the flow of solutions through the ECA system 100, pumps that direct flow into or out of the chlorine solution tank 120 and/or the alkaline solution tank 130, or the operation of any other component of the ECA system 100. In some embodiments, the electronic controller is configured to control one or more of the following to maintain the pH level of the anodic electrolyte in a range from about pH4 to about pH 7: time of recirculating of the anodic electrolyte, operating time and/or power of the cathode 116, or operating time and/or power of the neutralization cathode 118.

Once the concentrated chlorine solution and the concentrated alkaline solution are created, they can be dispensed for use (e.g., by a (ware) washing machine or other cleaning purposes). At block 210, the concentrated chlorine solution is dispensed from the chlorine solution tank 120. As shown in FIG. 3C, a flow 316 of the concentrated chlorine solution is dispensed out of the chlorine solution tank 120 via the chlorine solution supply line 124. At block 212, the concentrated alkaline solution is dispensed from the alkaline solution tank 130. As shown in FIG. 3C, a flow 318 of the concentrated alkaline solution is dispensed out of the alkaline solution tank 130 via the alkaline solution supply line 134.

In some embodiments, the concentrated chlorine solution and the concentrated alkaline solution are dispensed to a (ware) washing machine. In some examples, the concentrated chlorine solution and the concentrated alkaline solution are created while the washing machine is not in operation. In this way, ECA system 100 takes advantage of the machine "downtime" during which the washing machine is not operating (e.g. during night time). In this way, the concentrated chlorine solution and the concentrated alkaline solution are ready for use by the (ware) washing machine when it is operated or when cleaning solution is required for other cleaning purposes. In some embodiments, an ECA system (e.g., ECA system 100 or any other ECA system disclosed herein) is installed as an integrated component of a (ware) washing machine.

In some embodiments, the concentrated chlorine solution and the concentrated alkaline solution are dispensed to a container for use for other cleaning purposes, such as surface cleaning and disinfection. In some embodiments, an ECA system (e.g., ECA system 100 or any other ECA system disclosed herein) is configured to dilute the concentrated chlorine solution and/or the concentrated alkaline solution for use in a particular cleaning purpose. In some embodiments, an operator input may request dispensing cleaning solution for surface cleaning and the ECA system is configured to dilute the concentrated chlorine solution to a dispensing range in response to receiving the operator input. In one example, the operator input is a request for dispensing chlorine solution for surface cleaning and the ECA system is configured to dilute the concentrated chlorine solution to a dispensing range from about 200 ppm to about 1,200 ppm.

Figure 12A:
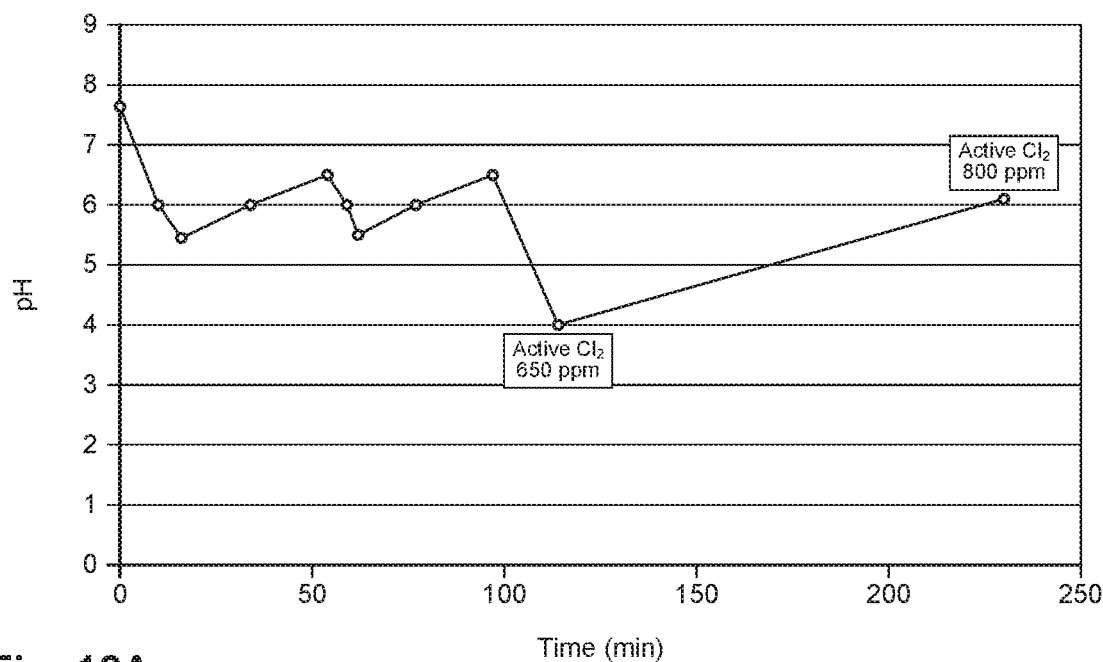
FIGS. 12A to 12I depict charts showing data gathered from examples of using the systems depicted, respectively, in FIGS. 1, 5, 6, 7, 8A, 9A, 10A, and 11A, in accordance with the embodiments disclosed herein.

A test of the ECA system 100 was performed and the results of the test are shown in Table 1 and the chart depicted in FIG. 12A. At the beginning of the test (i.e., at 0 minutes), the pH level of the chlorine solution was at 7.63 and the cathode 116 was powered on. The ECA system 100 was run with both the cathode 116 and the neutralization cathode 118 active. After 10 minutes, the pH level of the chlorine solution had dropped to 6.0 and, after 16 minutes, the pH level of the chlorine solution had dropped to 5.45. Even though the neutralization cathode 118 was active during the time between 0 and 16 minutes, the neutralization cathode 118 was unable to maintain the pH level of the chlorine solution constant. At 16 minutes, the cathode 116 was powered off and the ECA system 100 continued to run in this manner until 54 minutes. This time allowed the neutralization cathode 118 to raise the pH level of the chlorine solution up to 6.5. At 54 minutes, the cathode 116 was again powered on to continue production of the chlorine solution, although this also resulted in continued decrease of the pH level of the chlorine solution. This alternating between a production mode (i.e., with both the cathode 116 and the neutralization cathode 118 powered on) and a neutralization mode (i.e., with the cathode 116 powered off and the neutralization cathode 118 powered on) continued to facilitate both chlorine production and pH control.

At 114 minutes, the chorine solution was at a pH level of 4.0 and the concentration of active $Cl_2$ was measured at 650 ppm. The cathode 116 was powered off so that the ECA system 100 entered the neutralization mode and allowed the pH level to increase. While the ECA system 100 was in neutralization mode between 114 minutes and 230 minutes, the pH level rose to 6.1. Also, surprisingly, the concentration of the active $Cl_2$ continued to rise up to 800 ppm.

TABLE 1

Anolyte neutralization test data using ECA system 100

| Time (min) | pH | Active $Cl_2$ (ppm) | Power to cathode 116 |
|---|---|---|---|
| 0 | 7.63 | (no data gathered) | ON |
| 10 | 6.0 | (no data gathered) | ON |
| 16 | 5.45 | (no data gathered) | OFF |
| 34 | 6.0 | (no data gathered) | OFF |
| 54 | 6.5 | (no data gathered) | ON |
| 59 | 6.0 | (no data gathered) | ON |
| 62 | 5.5 | (no data gathered) | OFF |
| 77 | 6.0 | (no data gathered) | OFF |
| 97 | 6.5 | (no data gathered) | ON |
| 114 | 4.0 | 650 | OFF |
| 230 | 6.1 | 800 | OFF |

Figure 5:
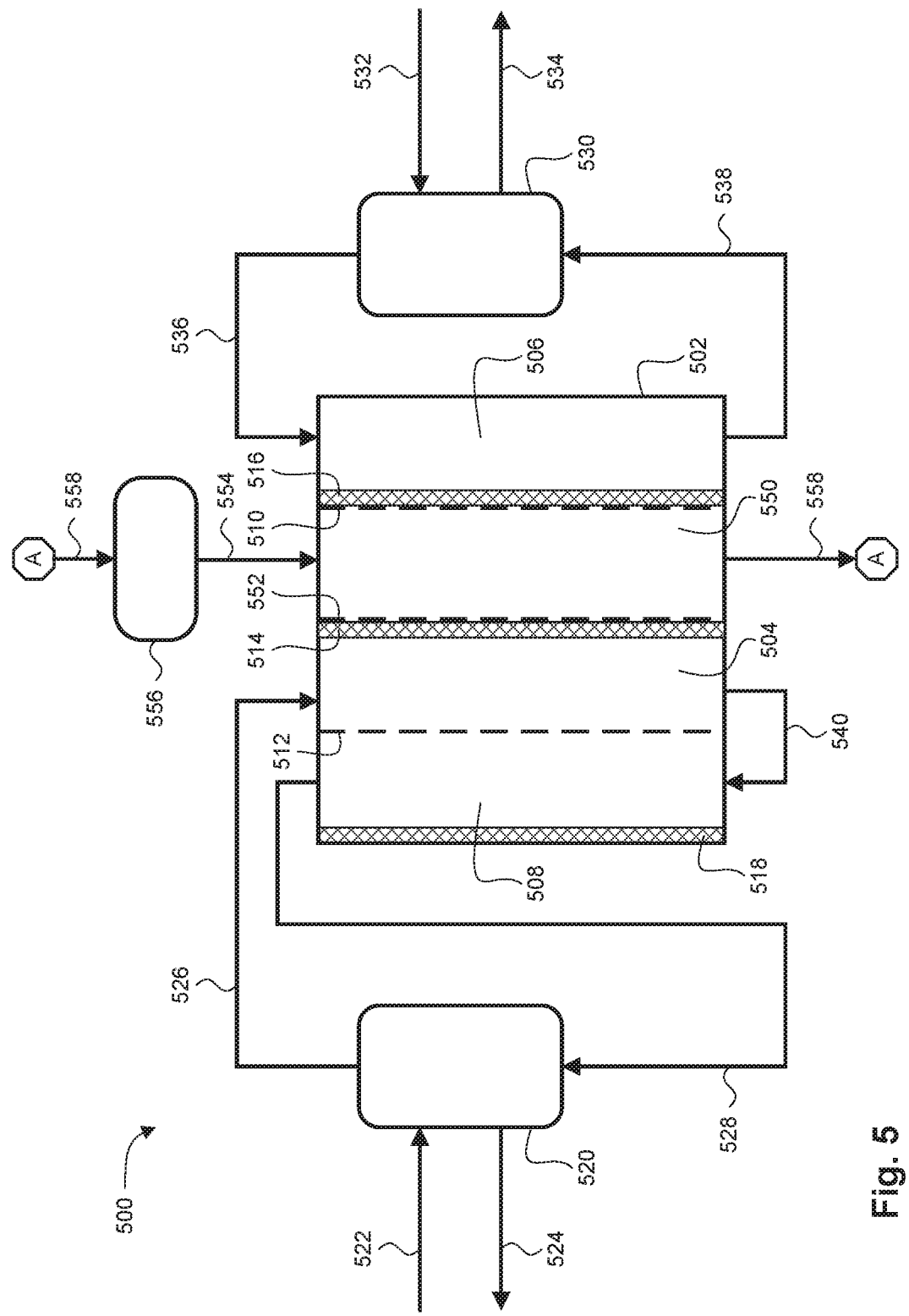
FIG. 5 depicts an embodiment of an ECA system that is a variation of the embodiment of an ECA system depicted in FIG. 1 with a separate recirculating brine flow, in accordance with the embodiments disclosed herein.

Another embodiment of an ECA system 500 is depicted in FIG. 5. The ECA system 500 includes a chamber cell 502 that includes an anode chamber 504, a cathode chamber 506, a neutralization chamber 508, and a brine chamber 550. The brine chamber 550 is separated from the cathode chamber 506 by a first membrane 510, the anode chamber 504 is separated from the neutralization chamber 508 by a second membrane 512, and the anode chamber 504 is separated from the brine chamber 550 by a third membrane 552. In some embodiments, the first and second membranes 510 and 512 are cation exchange membranes or bipolar membranes. In some embodiments, the first and second membranes 510 and 512 are configured to hinder the migration of $Cl^-$, while permitting electrolysis to be performed by an anode and a cathode on either side of the membrane. In some embodiments, the third membrane 552 is an anion exchange membrane that allows migration of $Cl^-$, while hindering migration of sodium, and while permitting electrolysis to be performed by an anode and a cathode on either side of the membrane.

The anode chamber 504 includes an anode 514. In some embodiment, the anode 514 is solid, porous, or meshed electrode. In some embodiments, the anode 514 is made from titanium with a titanium oxide coating or an iridium coating or DSA-Cl type coating. In some embodiments, the anode 514 is made from graphite. In the depicted embodiment, the anode 514 is placed in the anode chamber 504 near the third membrane 552. The cathode chamber 506 includes a cathode 516. In some embodiments, the cathode 516 is a porous or meshed electrode. In some embodiments, the cathode 516 is made from titanium. In some embodiments, the cathode 516 is made from graphite. In some embodiments, as shown in FIG. 5, the cathode 516 is placed in the cathode chamber 506 in direct contact with the first membrane 510.

The neutralization chamber 508 includes a neutralization cathode 518. In some embodiments, the neutralization cathode 518 is a solid, porous or meshed electrode. In some embodiments, the neutralization cathode 518 is made from titanium with a titanium oxide coating or an iridium coating DSA-Cl type coating. In some embodiments, the neutralization cathode 518 is made from graphite. In some embodiments, as shown in FIG. 5, the neutralization cathode 518 is placed in the neutralization chamber 508 near a side of the neutralization chamber 508 that is opposite of the second membrane 512.

The ECA system 500 also includes a chlorine solution tank 520. A water supply line 522 is configured to carry raw or softened water into the chlorine solution tank 520. A chlorine solution supply line 524 is configured to carry chlorine solution out of the chlorine solution tank 520 to an external destination (e.g., a washing machine). An anode chamber supply line 526 is configured to carry fluid (e.g., water, anodic electrolyte, etc.) out of the chlorine solution tank 520 to the anode chamber 504.

A neutralization supply line 540 is configured to carry anodic electrolyte out of the anode chamber 504 to the neutralization chamber 508. In some embodiments, such as the embodiment shown in FIG. 5, the neutralization supply line 540 is configured to carry anodic electrolyte out of the anode chamber 504 from a side of the anode chamber 504 that is opposite of the side of the anode chamber 504 into which the anode chamber supply line 526 carries fluid into the anode chamber 504. An anode return line 528 is configured to carry anodic electrolyte out of the neutralization chamber 508 back to the chlorine solution tank 520. In some embodiments, such as the embodiment shown in FIG. 5, the anode return line 528 is configured to carry anodic electrolyte out of the neutralization chamber 508 from a side of the neutralization chamber 508 that is opposite of the side of the neutralization chamber 508 into which the neutralization supply line 540 carries anodic electrolyte into the neutralization chamber 508.

The ECA system 500 also includes an alkaline solution tank 530. A water supply line 532 is configured to carry raw or softened water into the alkaline solution tank 530. An alkaline solution supply line 534 is configured to carry alkaline solution out of the alkaline solution tank 530 to an external destination (e.g., a washing machine). A cathode chamber supply line 536 is configured to carry fluid (e.g., water, cathodic electrolyte, etc.) out of the alkaline solution tank 530 to the cathode chamber 506. A cathode return line 538 is configured to carry cathodic electrolyte out of the cathode chamber 506 back to the alkaline solution tank 530. In some embodiments, such as the embodiment shown in FIG. 5, the cathode return line 538 is configured to carry cathodic electrolyte out of the cathode chamber 506 from a side of the cathode chamber 506 that is opposite of the side of the cathode chamber 506 into which the cathode chamber supply line 536 carries fluid into the cathode chamber 506.

The ECA system 500 also includes a brine supply line 554 configured to carry brine from an external brine tank 556 into the brine chamber 550. A brine return line 558 is configured to remove brine from the brine chamber 550. In some embodiments, such as the embodiment shown in FIG. 5, the brine return line 558 is configured to carry brine out of the brine chamber 550 from a side of the brine chamber 550 that is opposite of the side of the brine chamber 550 into which the brine supply line 554 carries brine into the brine chamber 550. In some embodiments, the brine return line 558 is configured to carry brine out of the brine chamber 550 and return it to the external brine tank 556.

In some embodiments, the operation of the ECA system 500 is similar to the operation of the ECA system 100. However, in the ECA system 500, the water supply line 522 carries raw or softened water into the chlorine solution tank 520 instead of the brine that is carried into the chlorine solution tank 120 by the brine supply line 122 in ECA system 100. In addition, brine circulates from the external brine tank 556, through the brine chamber 550, and back to the external brine tank 556. As the brine flows through the brine chamber 550, the third membrane 552 permits Cl⁻ from the brine to pass from the brine chamber 550 into the anode chamber 504. The Cl⁻ in the anode chamber 504 is converted to hypochlorous acid according to the anode half-cell reaction (1). In this way, hypochlorous acid is generated in the anode chamber 504 without introducing brine into the chlorine solution tank 520. Because brine is not introduced into the chlorine solution tank 520, the cleaning performance of the chlorine solution tank 520 is improved as the chlorine solution will not leave streaks and stripes behind after cleaning/disinfection of surfaces. In addition, because the third membrane 552 does not permit passage of sodium, the concentrated chlorine solution generated in to the chlorine solution tank 520 is substantially free from sodium.

In some embodiments, the other portions of the ECA system 500 are configured to operate in similar ways to their counterparts in the ECA system 100. In one example, recirculating anodic electrolyte is passed through the neutralization chamber 508 after it leaves the anode chamber 504 to maintain a pH level of the anodic electrolyte at a safe level (e.g., above about pH 4). In another example, water circulates from the alkaline solution tank 530 to the cathode chamber 506 to be converted to an alkaline solution. In yet another example, concentrated chlorine solution is dispensed from chlorine solution tank 520 via the chlorine solution supply line 524 and concentrated alkaline solution is dispensed from the alkaline solution tank 530 via the alkaline solution supply line 534.

Figure 12B:
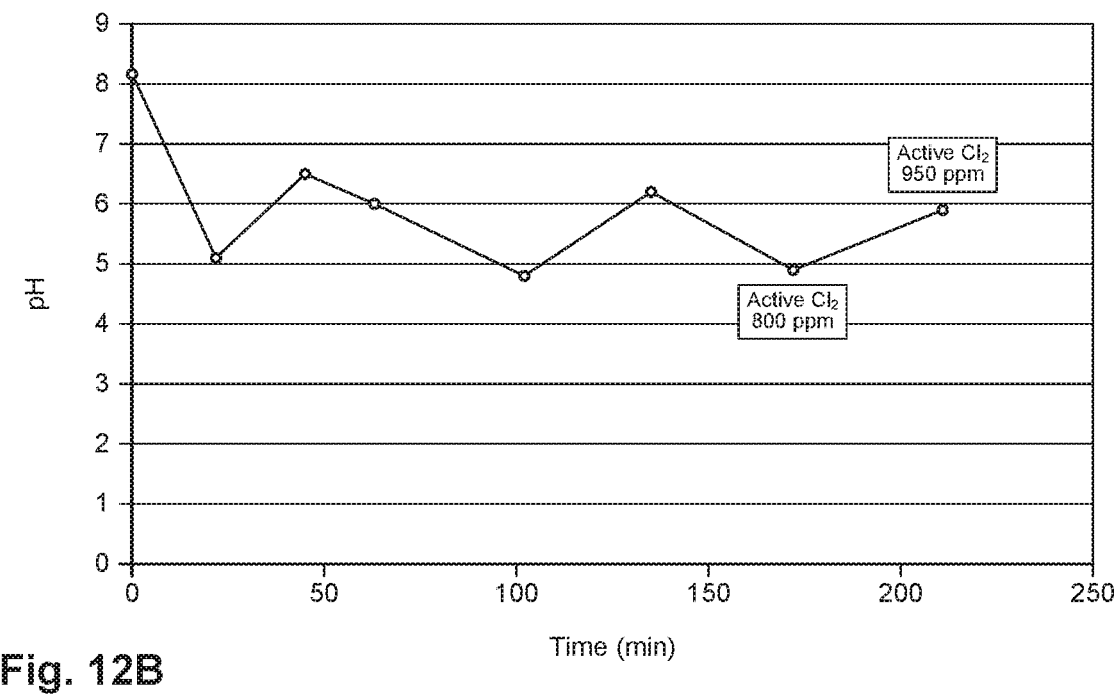

A test of the ECA system 500 was performed and the results of the test are shown in Table 2 and the chart depicted in FIG. 12B. At the beginning of the test (i.e., at 0 minutes), the pH level of the chlorine solution was at 8.15 and the cathode 516 was powered on. The ECA system 500 was run with both the cathode 516 and the neutralization cathode 518 active. After 22 minutes, the pH level of the chlorine solution had dropped to 5.1. Even though the neutralization cathode 518 was active during the time between 0 and 22 minutes, the neutralization cathode 518 was unable to maintain the pH level of the chlorine solution constant. At 22 minutes, the cathode 516 was powered off and the ECA system 500 continued to run in this manner until 45 minutes. This time allowed the neutralization cathode 518 to raise the pH level of the chlorine solution up to 6.5. At 45 minutes, the cathode 516 was again powered on to continue production of the chlorine solution, although this also resulted in continued decrease of the pH level of the chlorine solution. This alternating between a production mode (i.e., with both the cathode 516 and the neutralization cathode 518 powered on) and a neutralization mode (i.e., with the cathode 516 powered off and the neutralization cathode 518 powered on) continued to facilitate both chlorine production and pH control.

At 172 minutes, the chorine solution was at a pH level of 4.9 and the concentration of active $Cl_2$ was measured at 800 ppm. The cathode 516 was powered off so that the ECA system 500 entered the neutralization mode and allowed the pH level to increase. While the ECA system 500 was in neutralization mode between 172 minutes and 211 minutes, the pH level rose to 5.9. Also, surprisingly, the concentration of the active $Cl_2$ continued to rise up to 950 ppm.

TABLE 2

Anolyte neutralization test data using ECA system 500

| Time (min) | pH | Active $Cl_2$ (ppm) | Power to cathode 516 |
|---|---|---|---|
| 0 | 8.15 | (no data gathered) | ON |
| 22 | 5.1 | (no data gathered) | OFF |
| 45 | 6.5 | (no data gathered) | ON |
| 63 | 6.0 | (no data gathered) | ON |
| 102 | 4.8 | (no data gathered) | OFF |
| 135 | 6.2 | (no data gathered) | ON |
| 172 | 4.9 | 800 | OFF |
| 211 | 5.9 | 950 | OFF |

Figure 6:
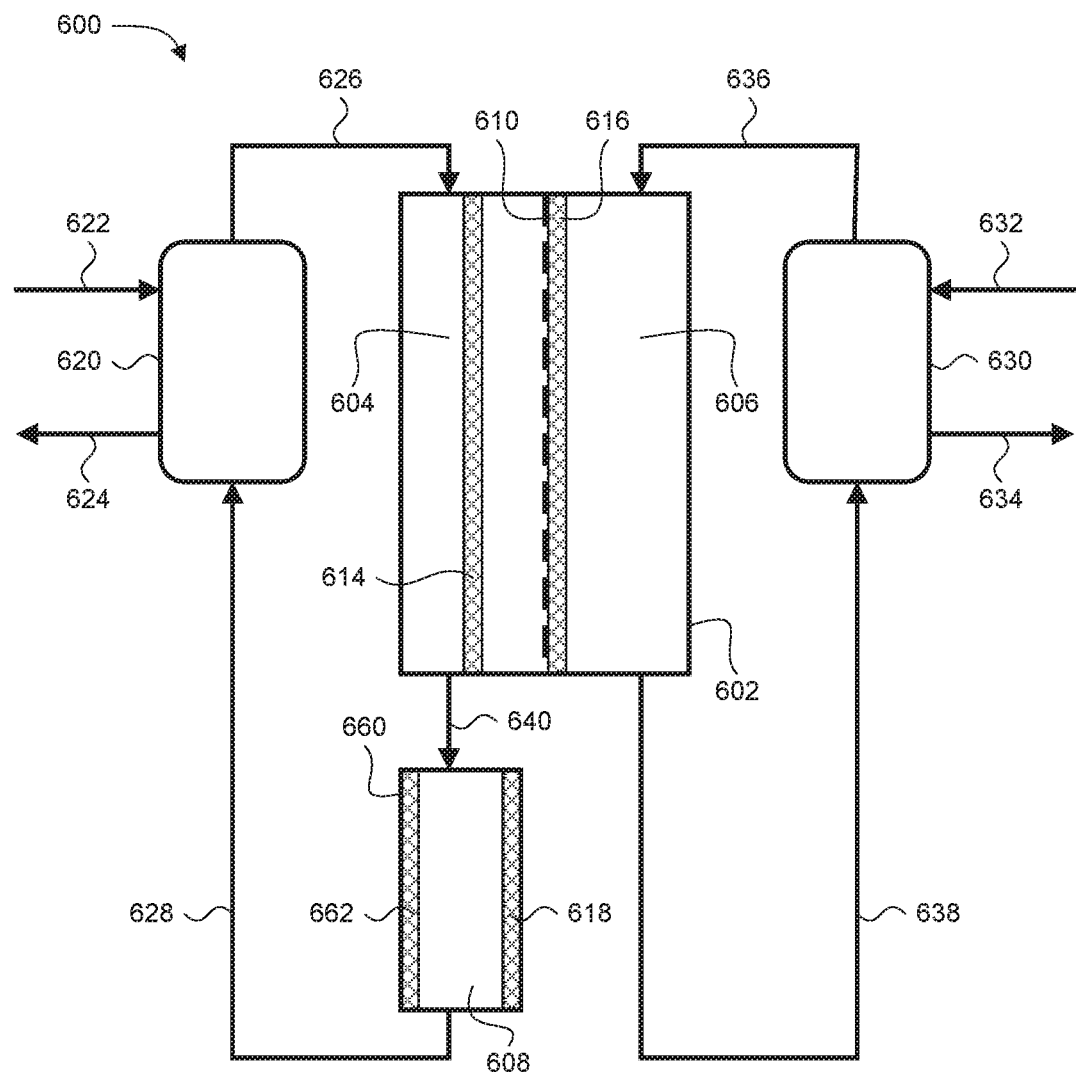
FIG. 6 depicts an embodiment of an ECA system that is a variation of the embodiment of an ECA system depicted in FIG. 1 with a separate independent neutralization cell, in accordance with the embodiments disclosed herein.

Depicted in FIG. 6 is another embodiment of an ECA system 600 configured to produce highly-concentrated alkaline solutions and highly-concentrated, pH-neutral chlorine solutions. The ECA system 600 includes a chamber cell 602 that includes an anode chamber 604 and a cathode chamber 606. The anode chamber 604 is separated from the cathode chamber 606 by a membrane 610. In some embodiments, the membrane 610 is a cation exchange membrane or a bipolar membrane. In some embodiments, the membrane 610 is configured to hinder the migration of Cl⁻, while permitting electrolysis to be performed by an anode and a cathode on either side of the membrane.

The anode chamber 604 includes an anode 614. In some embodiment, the anode 614 is solid, porous, or meshed electrode. In some embodiments, the anode 614 is made from titanium with a titanium oxide coating or an iridium (oxide) or an DSA-Cl type coating. In some embodiments, the anode 614 is made from graphite. In the depicted embodiment, the anode 614 is placed in the anode chamber 604 near the center of the anode chamber 604. The cathode chamber 606 includes a cathode 616. In some embodiments, the cathode 616 is a porous or meshed electrode. In some embodiments, the cathode 616 is made from titanium or graphite. In some embodiments, as shown in FIG. 6, the cathode 616 is placed in the cathode chamber 606 in direct contact with the membrane 610.

The ECA system 600 also includes a neutralization cell 660. The neutralization cell 660 includes a neutralization chamber 608. A neutralization cathode 618 is located in the neutralization chamber 608. In some embodiments, the neutralization cathode 618 is a solid, porous or meshed electrode. In some embodiments, the neutralization cathode 618 is made from titanium with a titanium oxide coating or an iridium coating. In some embodiments, the neutralization cathode 618 is made from graphite. In some embodiments, as shown in FIG. 6, the neutralization cathode 618 is placed in the neutralization chamber 608 near a side of the neutralization chamber 608. A neutralization anode 662 is also located in the neutralization chamber 608. In some embodiments, the neutralization cathode 618 and the neutralization anode 662 are located in the neutralization chamber 608 such that the ratio of exposed anode surface area in the neutralization chamber 608 to the exposed cathode surface area in the neutralization chamber 608 is in a range from about 1:1 to about 1:10,000.

The ECA system 600 also includes a chlorine solution tank 620. A brine supply line 622 is configured to carry brine from an external source (e.g., a brine tank) into the chlorine solution tank 620. A chlorine solution supply line 624 is configured to carry chlorine solution out of the chlorine solution tank 620 to an external destination (e.g., a washing machine). An anode chamber supply line 626 is configured to carry fluid (e.g., water, anodic electrolyte, etc.) out of the chlorine solution tank 620 to the anode chamber 604. A neutralization supply line 640 is configured to carry anodic electrolyte out of the anode chamber 604 to the neutralization chamber 608. In some embodiments, such as the embodiment shown in FIG. 6, the neutralization supply line 640 is configured to carry anodic electrolyte out of the anode chamber 604 from a side of the anode chamber 604 that is opposite of the side of the anode chamber 604 into which the anode chamber supply line 626 carries fluid into the anode chamber 604.

An anode return line 628 is configured to carry anodic electrolyte out of the neutralization chamber 608 back to the chlorine solution tank 620. In some embodiments, such as the embodiment shown in FIG. 6, the anode return line 628 is configured to carry anodic electrolyte out of the neutralization chamber 608 from a side of the neutralization chamber 608 that is opposite of the side of the neutralization chamber 608 into which the neutralization supply line 640 carries anodic electrolyte into the neutralization chamber 608.

The ECA system 600 also includes an alkaline solution tank 630. A water supply line 632 is configured to carry softened water from an external source (e.g., a water tank) into the alkaline solution tank 630. An alkaline solution supply line 634 is configured to carry alkaline solution from the alkaline solution tank 630 to an external destination (e.g., a washing machine). A cathode chamber supply line 636 is configured to carry fluid (e.g., water, cathodic electrolyte, etc.) out of the alkaline solution tank 630 to the cathode chamber 606. A cathode return line 638 is configured to carry cathodic electrolyte out of the cathode chamber 606 back to the alkaline solution tank 630. In some embodiments, such as the embodiment shown in FIG. 6, the cathode return line 638 is configured to carry cathodic electrolyte out of the cathode chamber 606 from a side of the cathode chamber 606 that is opposite of the side of the cathode chamber 606 into which the cathode chamber supply line 636 carries fluid into the cathode chamber 606.

In some embodiments, portions of the ECA system 600 are configured to operate in similar ways to their counterparts in the ECA system 100. In one example, recirculating anodic electrolyte is passed through the neutralization chamber 608 after it leaves the anode chamber 604 to maintain a pH level of the anodic electrolyte at a safe level (e.g., greater than about pH 4). In another example, water circulates from the alkaline solution tank 630 to the cathode chamber 606 to be converted to a cathodic electrolyte.

One difference between the ECA system 600 and the ECA system 100 is that the neutralization chamber 608 is not located in the chamber cell 602 where the anode chamber 604 and the cathode chamber 606 are located. This requires an extra anode (i.e., the neutralization anode 662) in the ECA system 600, but it also allows for greater control.

Figure 12C:
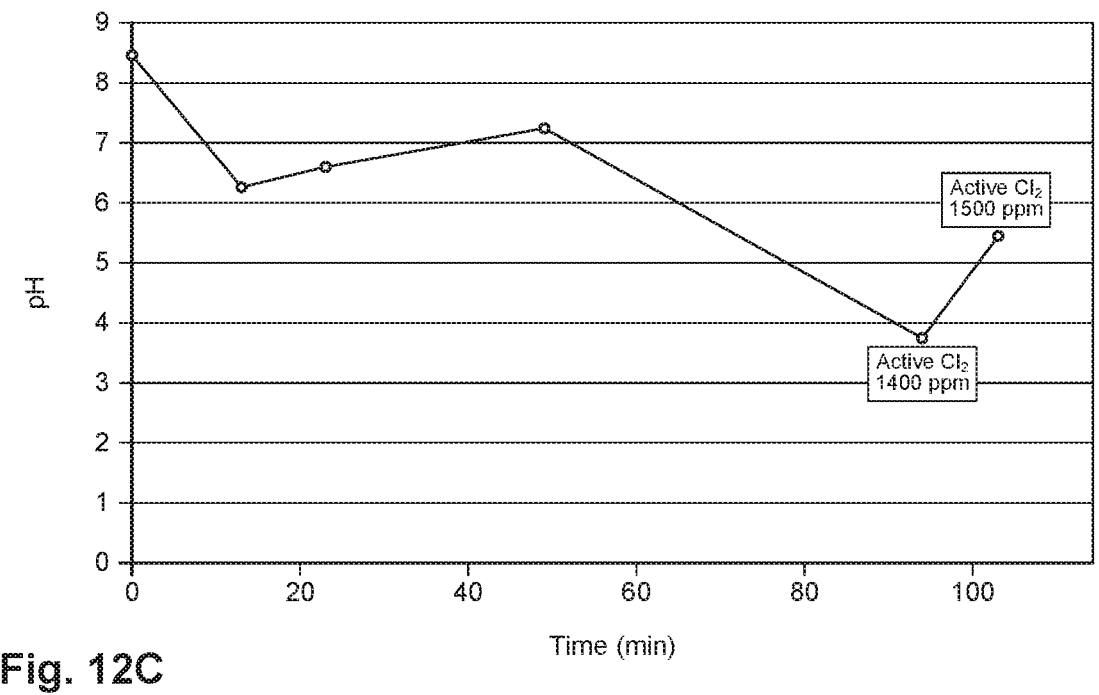

Two tests of the ECA system 600 were performed. The results of the first test the ECA system 600 are shown in Table 3 and the chart depicted in FIG. 12C. The first test was run for 103 minutes with the ECA system 600 alternating between a production mode (with the cathode 616 and the neutralization cathode 618 powered on) and a neutralization mode (with the neutralization cathode 618 powered on and the cathode 616 powered off). This alternating allows for the stimulated production of active $Cl_2$ in the chlorine solution while the ECA system 600 is in the production mode and the increase of the level of pH in the chlorine solution while the ECA system 600 is in the neutralization mode.

During the first test, the cathode 616 was powered on for the first 13 minutes and then the cathode 616 was powered off. At 23 minutes, the pH level was considered still low enough to keep the cathode 616 powered off. At 49 minutes, the cathode 616 powered on and continued operating until 94 minutes, at which point the pH level had fallen below 4.0 and the cathode 616 was powered off. At that point, the concentration of active $Cl_2$ reached 1400 ppm. The ECA system 600 operated in neutralization mode to raise the pH level until 103 minutes. During this time, even though the cathode 616 was powered off, the concentration of active $Cl_2$ continued to increase until it reached 1500 ppm.

TABLE 3

First anolyte neutralization test data using ECA system 600

| Time (min) | pH | Active $Cl_2$ (ppm) | Power to cathode 616 |
|---|---|---|---|
| 0 | 8.45 | (no data gathered) | ON |
| 13 | 6.25 | (no data gathered) | OFF |
| 23 | 6.6 | (no data gathered) | OFF |
| 49 | 7.24 | (no data gathered) | ON |
| 94 | 3.74 | 1400 | OFF |
| 103 | 5.45 | 1500 | OFF |

Figure 12D:
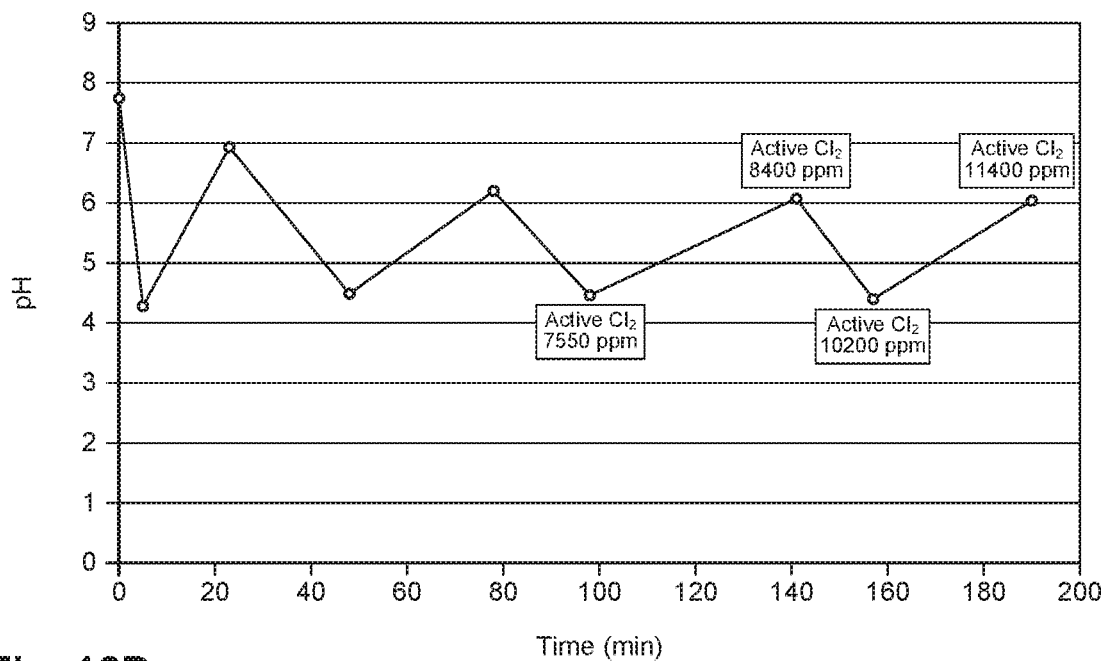

The results of the second test the ECA system 600 are shown in Table 4 and the chart depicted in FIG. 12D. Compared to the first test, the second test was run for a longer amount of time (190 minutes) under conditions to develop a higher concentration of active $Cl_2$. The ECA system 600 operated in production mode from the start of the test until 5 minutes. At that point, the ECA system 600 alternated between neutralization mode and production mode from 5 minutes until 190 minutes to keep the pH level in a range from about pH 4 to about pH 7 while increasing the concentration of active $Cl_2$. Data about the concentration of active $Cl_2$ was taken starting at 98 minutes and continued increasing in both production and neutralization modes until it reached 11400 ppm at 190 minutes.

TABLE 4

Second anolyte neutralization test data using ECA system 600

| Time (min) | pH | Active $Cl_2$ (ppm) | Power to cathode 616 |
|---|---|---|---|
| 0 | 7.74 | (no data gathered) | ON |
| 5 | 4.28 | (no data gathered) | OFF |
| 23 | 6.93 | (no data gathered) | ON |
| 48 | 4.49 | (no data gathered) | OFF |
| 78 | 6.2 | (no data gathered) | ON |
| 98 | 4.46 | 7550 | OFF |
| 141 | 6.07 | 8400 | ON |
| 157 | 4.4 | 10200 | OFF |
| 190 | 6.04 | 11400 | OFF |

Figure 7:
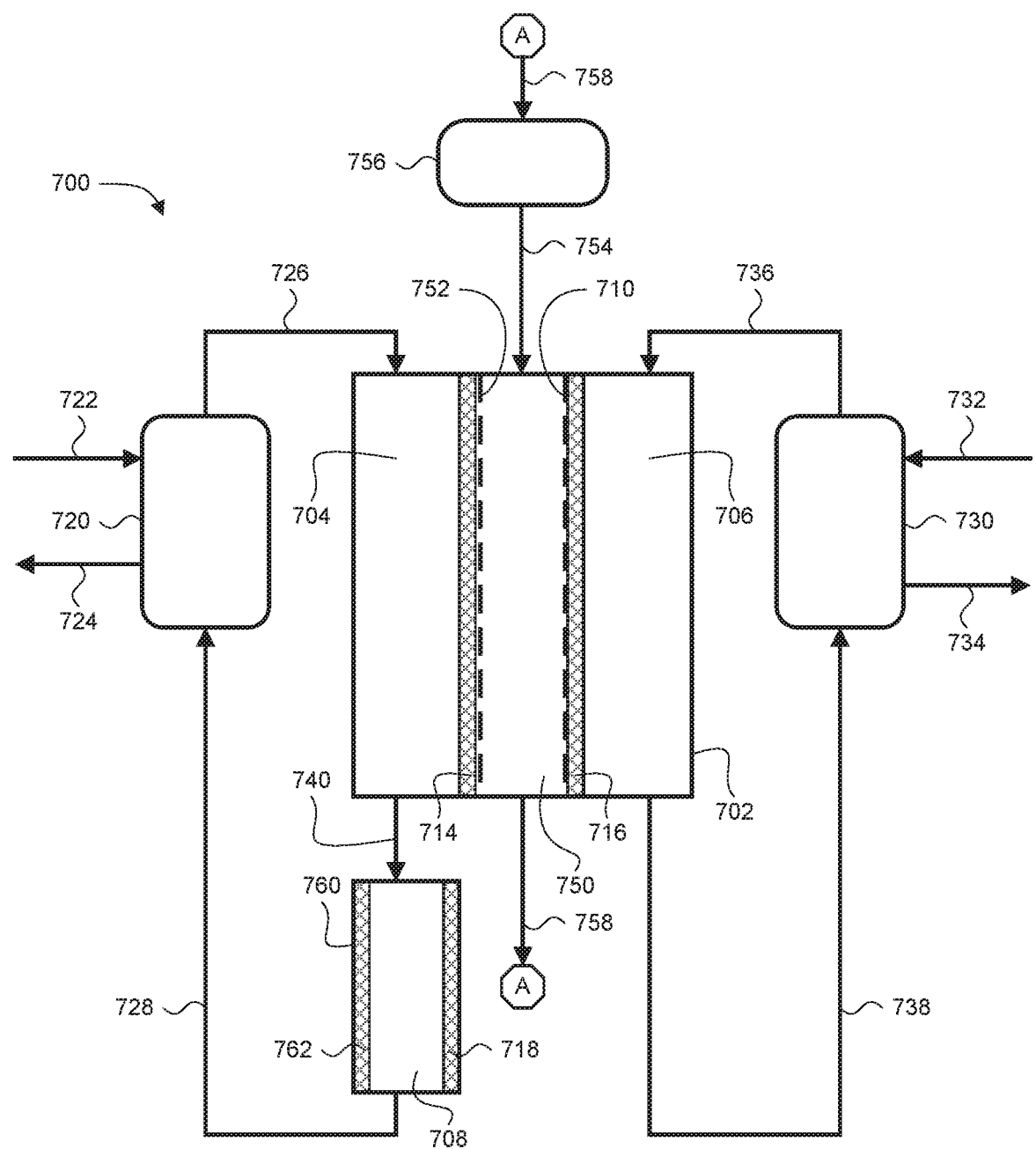
FIG. 7 depicts another embodiment of an ECA system that is a variation of the embodiment of an ECA system depicted in FIG. 1 with a separate recirculating brine flow and with a separate independent neutralization cell, in accordance with the embodiments disclosed herein.

Depicted in FIG. 7 is another embodiment of an ECA system 700 configured to produce highly-concentrated alkaline solutions and highly-concentrated, pH-neutral chlorine solutions. The ECA system 700 includes a chamber cell 702 that includes an anode chamber 704, a cathode chamber 706, and a brine chamber 750. The cathode chamber 706 is separated from the brine chamber 750 by a first membrane 710 and the anode chamber 704 is separated from the brine chamber 750 by a second membrane 752. In some embodiments, the first membrane 710 is a cation exchange membrane or a bipolar membrane. In some embodiments, the membrane 710 is configured to hinder the migration of $Cl^-$, while permitting electrolysis to be performed by an anode and a cathode on either side of the membrane. In some embodiments, the second membrane 752 is an anion exchange membrane that allows migration of Cl⁻, while hindering migration of sodium, and while permitting electrolysis to be performed by an anode and a cathode on either side of the membrane.

The anode chamber 704 includes an anode 714. In some embodiment, the anode 714 is solid, porous, or meshed electrode. In some embodiments, the anode 714 is made from titanium with a titanium oxide coating or an iridium (oxide) coating or a DSA-Cl type of coating. In some embodiments, the anode 714 is made from graphite. In the depicted embodiment, the anode 714 is placed in the anode chamber 704 in contact with the second membrane 752. The cathode chamber 706 includes a cathode 716. In some embodiments, the cathode 716 is a porous or meshed electrode. In some embodiments, the cathode 716 is made from titanium or graphite. In some embodiments, as shown in FIG. 7, the cathode 716 is placed in the cathode chamber 706 in direct contact with the first membrane 710.

The ECA system 700 also includes a neutralization cell 760. The neutralization cell 760 includes a neutralization chamber 708. A neutralization cathode 718 is located in the neutralization chamber 708. In some embodiments, the neutralization cathode 718 is a solid, porous or meshed electrode. In some embodiments, the neutralization cathode 718 is made from titanium with a titanium oxide coating or an iridium(oxide) coating or a DSA-Cl type coating. In some embodiments, the neutralization cathode 718 is made from graphite. In some embodiments, as shown in FIG. 7, the neutralization cathode 718 is placed in the neutralization chamber 708 near a side of the neutralization chamber 708. A neutralization anode 762 is also located in the neutralization chamber 708. In some embodiments, such as the embodiment shown in FIG. 7, the neutralization anode 762 is located in the neutralization chamber 708. In some embodiments, the portions of the neutralization cathode 718 and the neutralization anode 762 are located in the neutralization chamber 708 such that the ratio of exposed anode surface area in the neutralization chamber 708 to the exposed cathode surface area in the neutralization chamber 708 is in a range from about 1:1 to about 1:10,000.

The ECA system 700 also includes a chlorine solution tank 720. A water supply line 722 is configured to carry raw or softened water from an external source (e.g., a water tank) into the chlorine solution tank 720. A chlorine solution supply line 724 is configured to carry chlorine solution from the chlorine solution tank 720 to an external destination (e.g., a washing machine). An anode chamber supply line 726 is configured to carry fluid (e.g., water, anodic electrolyte) out of the chlorine solution tank 720 to the anode chamber 704. A neutralization supply line 740 is configured to carry anodic electrolyte out of the anode chamber 704 to the neutralization chamber 708. In some embodiments, such as the embodiment shown in FIG. 7, the neutralization supply line 740 is configured to carry anodic electrolyte out of the anode chamber 704 from a side of the anode chamber 704 that is opposite of the side of the anode chamber 704 into which the anode chamber supply line 726 carries fluid into the anode chamber 704.

An anode return line 728 is configured to carry anodic electrolyte out of the neutralization chamber 708 back to the chlorine solution tank 720. In some embodiments, such as the embodiment shown in FIG. 7, the anode return line 728 is configured to carry anodic electrolyte out of the neutralization chamber 708 from a side of the neutralization chamber 708 that is opposite of the side of the neutralization chamber 708 into which the neutralization supply line 740 carries anodic electrolyte into the neutralization chamber 708.

The ECA system 700 also includes an alkaline solution tank 730. A water supply line 732 is configured to carry softened water from an external source (e.g., a water tank) into the alkaline solution tank 730. An alkaline solution supply line 734 is configured to carry alkaline solution out of the alkaline solution tank 730 to an external destination (e.g., a washing machine). A cathode chamber supply line 736 is configured to carry fluid (e.g., water, cathodic electrolyte) out of the alkaline solution tank 730 to the cathode chamber 706. A cathode return line 738 is configured to carry cathodic electrolyte out of the cathode chamber 706 back to the alkaline solution tank 730. In some embodiments, such as the embodiment shown in FIG. 7, the cathode return line 738 is configured to carry cathodic electrolyte out of the cathode chamber 706 from a side of the cathode chamber 706 that is opposite of the side of the cathode chamber 706 into which the cathode chamber supply line 736 carries fluid into the cathode chamber 706.

The ECA system 700 also includes a brine supply line 754 configured to carry brine from an external brine tank 756 into the brine chamber 750. A brine return line 756 is configured to remove brine from the brine chamber 750. In some embodiments, such as the embodiment shown in FIG. 7, the brine return line 758 is configured to carry brine out of the brine chamber 750 from a side of the brine chamber 750 that is opposite of the side of the brine chamber 750 into which the brine supply line 754 carries brine into the brine chamber 750. In some embodiments, the brine return line 758 is configured to carry brine out of the brine chamber 750 and return it to the external brine tank 756.

In some embodiments, portions of the ECA system 700 are configured to operate in similar ways to their counterparts in the ECA system 100. In one example, recirculating anodic electrolyte is passed through the neutralization chamber 708 after it leaves the anode chamber 704 to maintain a pH level of the anodic electrolyte at a safe level. In another example, water circulates from the alkaline solution tank 730 to the cathode chamber 706 to be converted to a cathodic electrolyte.

One difference between the ECA system 700 and the ECA system 100 is that the neutralization chamber 708 is not located in the chamber cell 702 where the anode chamber 704 and the cathode chamber 706 are located. This requires an extra anode (i.e., the neutralization anode 762) in the ECA system 700, but it also allows for greater control.

Another difference between the ECA system 700 and the ECA system 100 is that the water supply line 722 carries raw or softened water into the chlorine solution tank 720 instead of the brine that is carried into the chlorine solution tank 120 by the brine supply line 122 in ECA system 100. In addition, brine circulates from the external brine tank 756, through the brine chamber 750, and back to the external brine tank 756. As the brine flows through the brine chamber 750, the second membrane 752 permits Cl⁻ from the brine to pass from the brine chamber 750 into the anode chamber 704. The Cl⁻ in the anode chamber 704 is converted to hypochlorous acid according to the anode half-cell reaction (1). In this way, hypochlorous acid in generated in the anode chamber 704 without introducing brine into the chlorine solution tank 720. Because brine is not introduced into the chlorine solution tank 720, the cleaning of the chlorine solution tank 720 is easier than the cleaning of the chlorine solution tank 120. In addition, because the second membrane 752 does not permit passage of sodium, the concentrated chlorine solution generated in to the chlorine solution tank 720 is largely free from sodium.

Figure 12E:
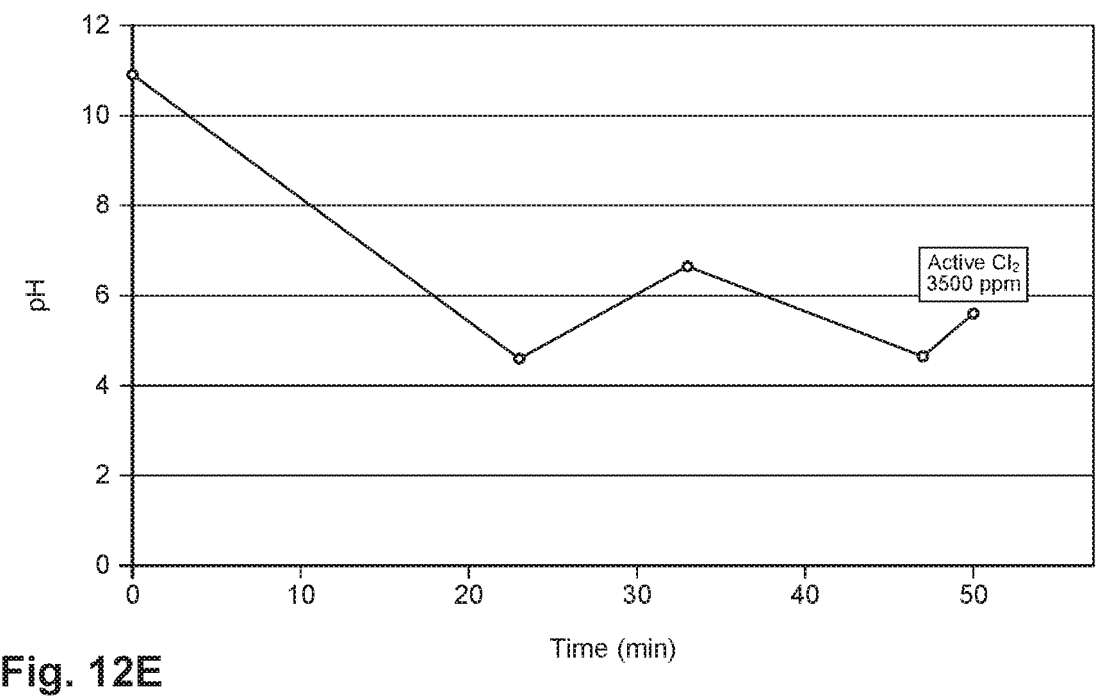

A test of the ECA system 700 was performed and the results of the test are shown in Table 5 and the chart depicted in FIG. 12E. The test was run for 50 minutes with the ECA system 700 alternating between a production mode (with the cathode 716 and the neutralization cathode 718 powered on) and a neutralization mode (with the neutralization cathode 718 powered on and the cathode 716 powered off). This alternating allows for the stimulated production of active $Cl_2$ in the chlorine solution while the ECA system 700 is in the production mode and the increase of the level of pH in the chlorine solution while the ECA system 700 is in the neutralization mode. The ECA system 700 operated in production mode from the start of the test until 23 minutes. At that point, the ECA system 700 alternated between neutralization mode and production mode from 23 minutes until 50 minutes to keep the pH level in a range from about pH 4 to about pH 7 while increasing the concentration of active $Cl_2$. The final concentration of active $Cl_2$ measured at 50 minutes was 3500 ppm with the final pH level at pH 5.6.

TABLE 5

Anolyte neutralization test data using ECA system 700

| Time (min) | pH | Active $Cl_2$ (ppm) | Power to cathode 716 |
|---|---|---|---|
| 0 | 10.9 | (no data gathered) | ON |
| 23 | 4.6 | (no data gathered) | OFF |
| 33 | 6.65 | (no data gathered) | ON |
| 47 | 4.65 | (no data gathered) | OFF |
| 50 | 5.6 | 3500 | OFF |

While some machines use highly-concentrated chlorine solutions and highly-concentrated alkaline solutions, such as those that can be produced by the ECA systems 100, 500, 600, and 700, other washing machines and/or cleaning applications use dilute chlorine solutions and dilute alkaline solutions. The ECA systems 100, 500, 600, and 700 are capable of producing dilute chlorine solutions and dilute alkaline solutions by not recirculating the anodic electrolyte and the cathodic electrolyte. However, in some embodiments, it may be desirable to use a system that creates only dilute, pH-neutral chlorine solutions and dilute alkaline solutions instead of using the ECA systems 100, 500, 600, and 700. Depicted in FIGS. 8-11 are embodiments of single-pass variations of the ECA systems 100, 500, 600, and 700 for producing dilute, pH-neutral chlorine solutions and dilute alkaline solutions.

Figure 8A:
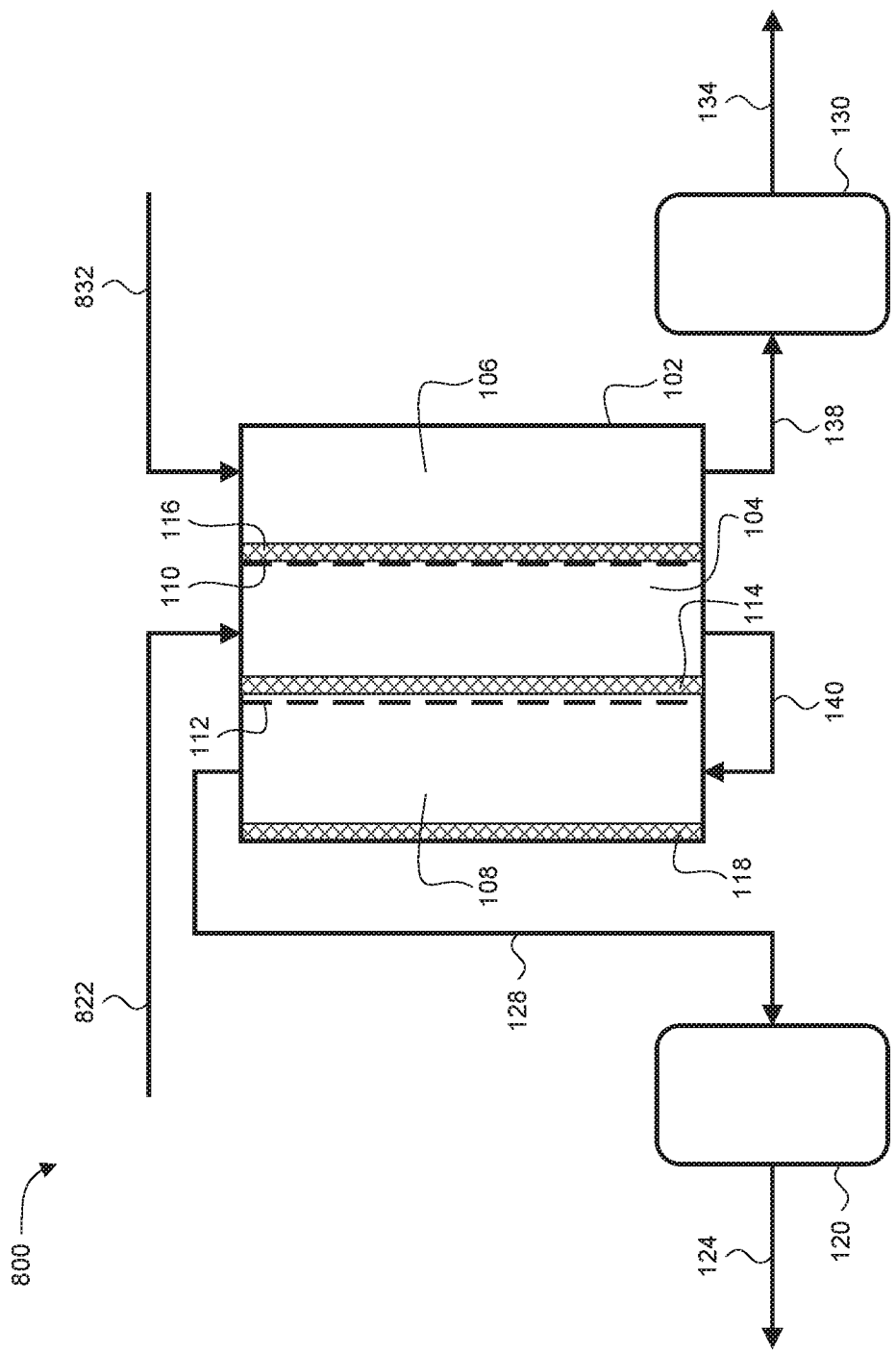
FIGS. 8A, 9A, 10A, and 11A depict embodiments of single pass ECA systems that produce alkaline solutions and pH-neutral chlorine solutions, in accordance with the embodiments disclosed herein.

Depicted in FIG. 8A is a single-pass ECA system 800 that is a variation of the ECA system 100 depicted in FIG. 1. The single-pass ECA system 800 is configured to produce dilute alkaline solutions and dilute, pH-neutral chlorine solutions. The single-pass ECA system 800 includes the chamber cell 102 that includes the anode chamber 104, the cathode chamber 106, and the neutralization chamber 108. As discussed above with respect to FIG. 1, the anode chamber 104 is separated from the cathode chamber 106 by the first membrane 110 and the anode chamber 104 is separated from the neutralization chamber 108 by the second membrane 112. The anode chamber 104 includes the anode 114, the cathode chamber 106 includes the cathode 116, and the neutralization chamber 108 includes the neutralization cathode 118.

The ECA system 800 also includes the chlorine solution tank 120. In contrast to the ECA system 100, the ECA system 800 includes a brine supply line 822 configured to carry brine from an external source (e.g., a brine tank) into the anode chamber 104. Similar to the ECA system 100, the chlorine solution supply line 124 is configured to carry chlorine solution out of the chlorine solution tank 120 to an external destination (e.g., a washing machine). The neutralization supply line 140 is configured to carry anodic electrolyte out of the anode chamber 104 to the neutralization chamber 108. The anode return line 128 is configured to carry anodic electrolyte out of the neutralization chamber 108 to the chlorine solution tank 120.

The ECA system 800 also includes the alkaline solution tank 130. In contrast to the ECA system 100, the ECA system 800 includes a water supply line 832 configured to carry water (e.g., raw or softened water) from an external source (e.g., a water tank) into the cathode chamber 106. Similar to the ECA system 100, the alkaline solution supply line 134 is configured to carry alkaline solution out of the alkaline solution tank 130 to an external destination (e.g., a washing machine). A cathode return line 138 is configured to carry cathodic electrolyte out of the cathode chamber 106 to the alkaline solution tank 130.

In the embodiment shown in FIG. 8A, the ECA system 800 does not have a recirculation path for either the anodic electrolyte or cathodic electrolyte. Thus, the brine passes through the anode chamber 104 one time to form the anodic electrolyte (i.e., a dilute chlorine solution), but the anodic electrolyte is not cycled back through the anode chamber 104. Similarly, the water passes through the cathode chamber 106 one time to form the cathodic electrolyte (i.e., a dilute alkaline solution), but the cathodic electrolyte does not cycle back through the cathode chamber 106. Because the brine passes through the anode chamber 104 one time and the water passes through the cathode chamber 106 one time, the resulting chlorine solution and alkaline solution are not as concentrated as they would be if they were recirculated through the anode chamber 104 and the cathode chamber 106. This provides the ability to generate dilute alkaline and chlorine solutions on demand. In addition, the neutralization chamber 108 is configured to prevent the dilute chlorine solution from dropping down to pH levels where chlorine gas may form.

Figure 12F:
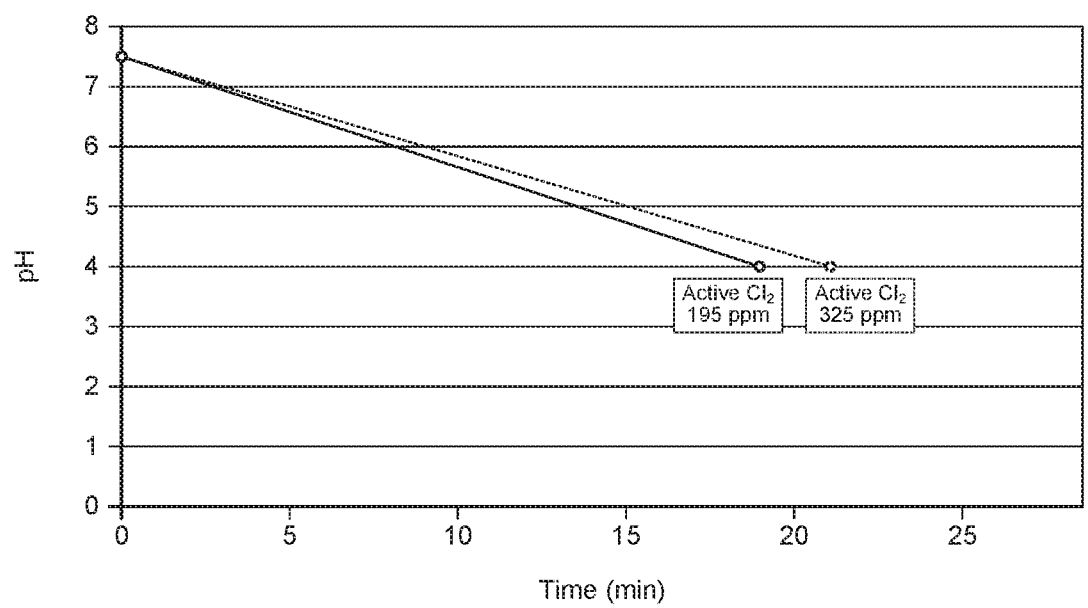

A test of the ECA system 800 was performed and the results of the test are shown in Table 6 and the chart depicted in FIG. 12F. Because the ECA system 800 is a single-pass system, the test of the ECA system 800 includes two runs of the solution from pH 7.5 to pH 4.0: (1) a production-only run with the cathode 116 powered on and the neutralization cathode 118 powered off, and (2) a production and neutralization run with both of the cathodes 116 and 118 powered on. In the production-only run, the ECA system 800 operated for 19 minutes before the pH level dropped to 4.0 and the concentration of active $Cl_2$ rose to 195 ppm. In the production and neutralization run, the ECA system 800 operated for 21 minutes before the pH level dropped to 4.0 and the concentration of active $Cl_2$ rose to 325 ppm. Thus, activating the neutralization cathode 118 permitted an increase in the concentration of the active $Cl_2$ by 66.7% while increasing the time by only 10.5%.

TABLE 6

Anolyte (neutralization) test data using ECA system 800

| | Cathode 116 Active Only | | Cathodes 116 and 118 Active | |
|---|---|---|---|---|
| Time (min) | pH | Active Cl$_2$ (ppm) | pH | Active Cl$_2$ (ppm) |
| 0 | 7.5 | (no data gathered) | 7.5 | (no data gathered) |
| 19 | 4.0 | 195 | — | — |
| 21 | — | — | 4.0 | 325 |

Figure 8B:
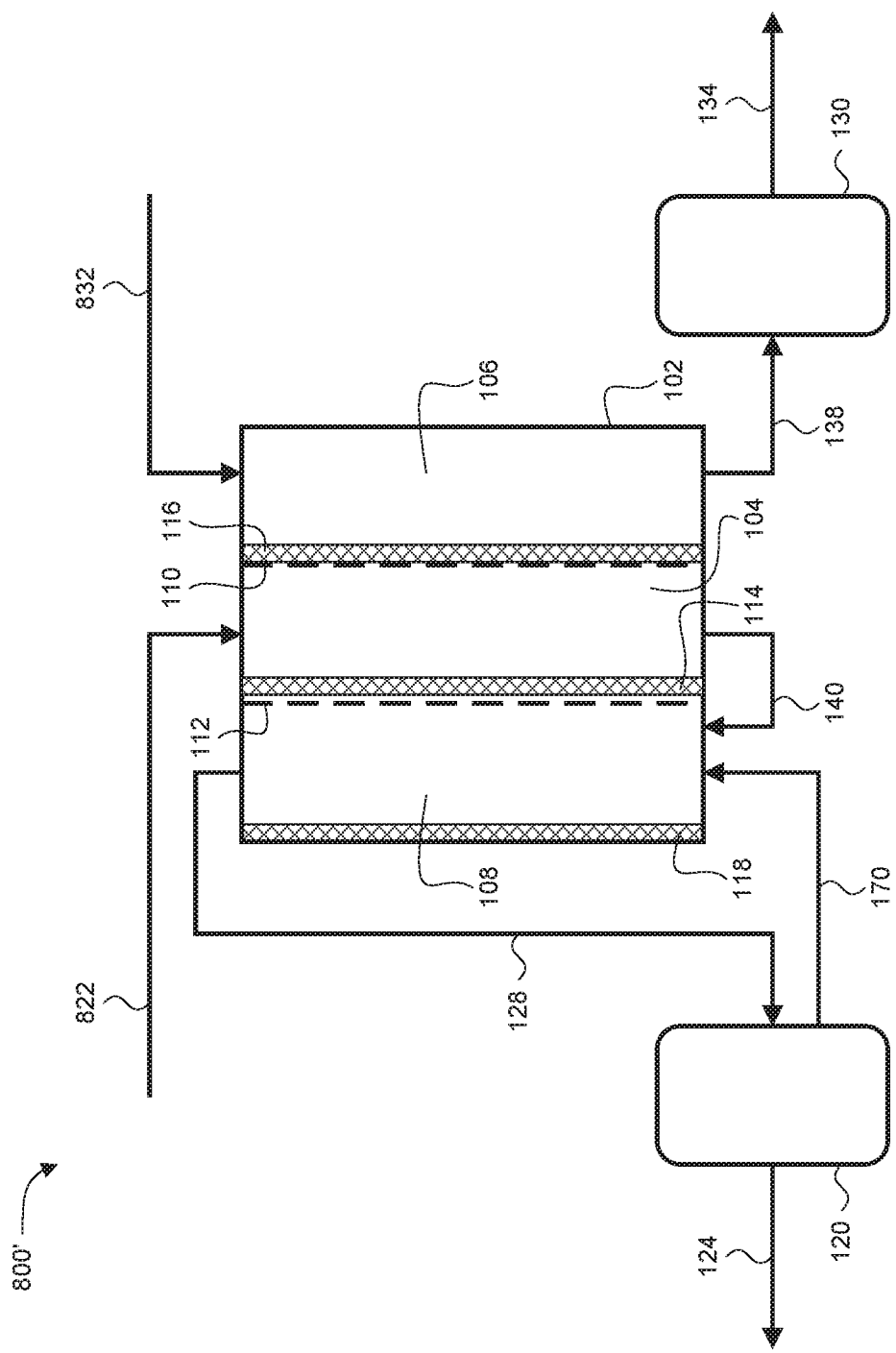
FIGS. 8B, 9B, 10B, and 11B depict variations of the single pass ECA systems shown in FIGS. 8A, 9A, 10A, and 11A, respectively, having a neutralization recirculation path, in accordance with the embodiments disclosed herein.

Depicted in FIG. 8B is an ECA system 800' that is a hybrid recirculating version of the ECA system 800 depicted in FIG. 8A. In particular, the ECA system 800' includes a neutralization recirculation path 170. The neutralization recirculation path 170 is configured to carry chlorine solution from the chlorine solution tank 120 back to the neutralization chamber 108. The chlorine solution can pass through the neutralization chamber 108 and then return to the chlorine solution tank 120 via the anode return line 128. The ECA system 800' is capable of passing brine through the anode chamber 104 one time, while passing the resulting chlorine solution through the neutralization chamber 108 multiple times. The effect of this is to raise the pH level of the chlorine solution even further than a single pass through the neutralization chamber 108 may raise the pH level of the chlorine solution.

When concentration levels of chlorine in chlorine solutions rise to particular levels, the chlorine solution can become corrosive. Corrosive chlorine solutions can cause damage to components of ECA systems or stoppage in operation of ECA system. One benefit to hybrid recirculating ECA systems, such as the ECA system 800', is the avoidance of corrosive levels of chlorine in the chlorine solution. For example, in the ECA system 800', the chlorine solution generated in the anode chamber 104 does not have a high enough concentration of chlorine to be corrosive, and the chlorine solution can pass through the neutralization chamber 108 multiple times to reduce the acidity of the chlorine solution. In fact, this benefit of increasing pH levels by recirculating chlorine solution through a neutralization chamber in hybrid recirculation ECA systems can also be achieved by full recirculation ECA systems, such as the ECA systems 100, 500, 600, and 700 described herein.

Figure 9A:
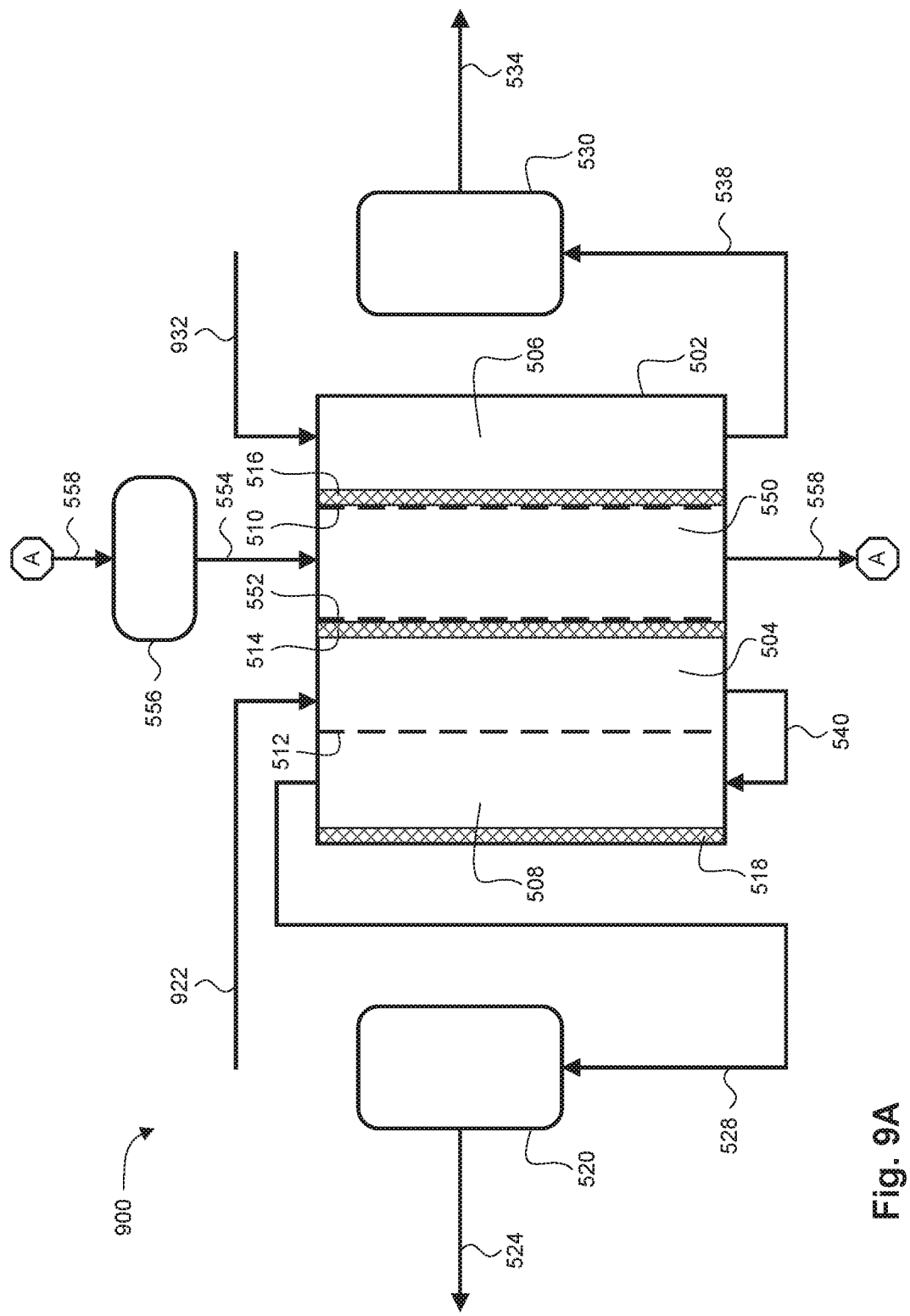

Depicted in FIG. 9A is a single-pass ECA system 900 that is a variation of the ECA system 500 depicted in FIG. 5. The ECA system 900 includes the chamber cell 502 that includes the anode chamber 504, the cathode chamber 506, the neutralization chamber 508, and the brine chamber 550. The brine chamber 550 is separated from the cathode chamber 506 by the first membrane 510, the anode chamber 504 is separated from the neutralization chamber 508 by the second membrane 512, and the anode chamber 504 is separated from the brine chamber 550 by the third membrane 552. The anode chamber 504 includes the anode 514, the cathode chamber 506 includes the cathode 516, and the neutralization chamber 508 includes a neutralization cathode 518.

The ECA system 900 also includes the chlorine solution tank 520. In contrast to the ECA system 500, the ECA system 900 includes a water supply line 922 configured to carry raw or softened water into the anode chamber 504. Similar to the ECA system 500, the chlorine solution supply line 524 is configured to carry chlorine solution out of the chlorine solution tank 520 to an external destination (e.g., a washing machine). The neutralization supply line 540 is configured to carry anodic electrolyte out of the anode chamber 504 to the neutralization chamber 508. The anode return line 528 is configured to carry anodic electrolyte out of the neutralization chamber 508 back to the chlorine solution tank 520.

The ECA system 900 also includes the alkaline solution tank 530. In contrast to the ECA system 500, the ECA system 900 includes a water supply line 932 is configured to carry raw or softened water into the cathode chamber 506. Similar to the ECA system 500, the alkaline solution supply line 534 is configured to carry alkaline solution out of the alkaline solution tank 530 to an external destination (e.g., a washing machine). The cathode return line 538 is configured to carry cathodic electrolyte out of the cathode chamber 506 back to the alkaline solution tank 530. The ECA system 900 also includes the brine supply line 554 configured to carry brine from the external brine tank 556 into the brine chamber 550. The brine return line 558 is configured to remove brine from the brine chamber 550. In some embodiments, the brine return line 558 is configured to carry brine out of the brine chamber 550 and return it to the external brine tank 556.

In some embodiments, the operation of the ECA system 900 is similar to the operation of the ECA system 500. However, in the ECA system 900, the water supply line 922 carries raw or softened water into the anode chamber 504 instead of the brine that is carried into the chlorine solution tank 520 by the brine supply line 522 in ECA system 500. In addition, brine circulates from the external brine tank 556, through the brine chamber 550, and back to the external brine tank 556. As the brine flows through the brine chamber 550, the third membrane 552 permits Cl⁻ from the brine to pass from the brine chamber 550 into the anode chamber 504. The Cl⁻ in the anode chamber 504 is converted to hypochlorous acid according to the anode half-cell reaction (1).

In the embodiment shown in FIG. 9A, the ECA system 900 does not have a recirculation path for either the anodic electrolyte or cathodic electrolyte. Thus, the brine passes through the anode chamber 504 one time to form the anodic electrolyte (i.e., a dilute chlorine solution), but the anodic electrolyte is not cycled back through the anode chamber 504. Similarly, the water passes through the cathode chamber 506 one time to form the cathodic electrolyte (i.e., a dilute alkaline solution), but the cathodic electrolyte does not cycle back through the cathode chamber 506. Because the brine passes through the anode chamber 504 one time and the water passes through the cathode chamber 506 one time, the resulting chlorine solution and alkaline solution are not as concentrated as they would be if they were recirculated through the anode chamber 504 and the cathode chamber 506. This provides the ability to generate dilute alkaline and chlorine solutions on demand. In addition, the neutralization chamber 508 is configured to prevent the dilute chlorine solution from dropping down to pH levels where chlorine gas may form.

Figure 12G:
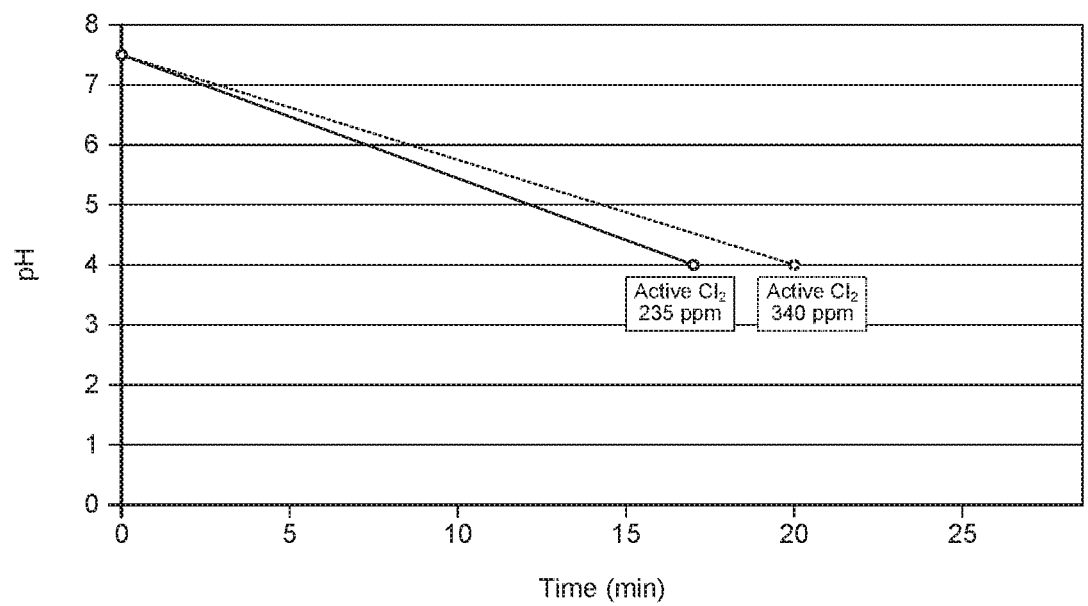

A test of the ECA system 900 was performed and the results of the test are shown in Table 7 and the chart depicted in FIG. 12G. Because the ECA system 900 is a single-pass system, the test of the ECA system 900 includes two runs of the solution from pH 7.5 to pH 4.0: (1) a production-only run with the cathode 516 powered on and the neutralization cathode 518 powered off, and (2) a production and neutralization run with both of the cathodes 516 and 518 powered on. In the production-only run, the ECA system 900 operated for 17 minutes before the pH level dropped to 4.0 and the concentration of active Cl$_2$ rose to 235 ppm. In the production and neutralization run, the ECA system 900 operated for 20 minutes before the pH level dropped to 4.0 and the concentration of active Cl₂ rose to 340 ppm. Thus, activating the neutralization cathode 518 permitted an increase in the concentration of the active Cl₂ by 44.7% while increasing the time by only 17.6%.

TABLE 7

Anolyte (neutralization) test data using ECA system 900

| | Cathode 516 Active Only | | Cathodes 516 and 518 Active | |
|---|---|---|---|---|
| Time (min) | pH | Active Cl₂ (ppm) | pH | Active Cl₂ (ppm) |
| 0 | 7.5 | (no data gathered) | 7.5 | (no data gathered) |
| 17 | 4.0 | 235 | — | — |
| 20 | — | — | 4.0 | 340 |

Figure 9B:
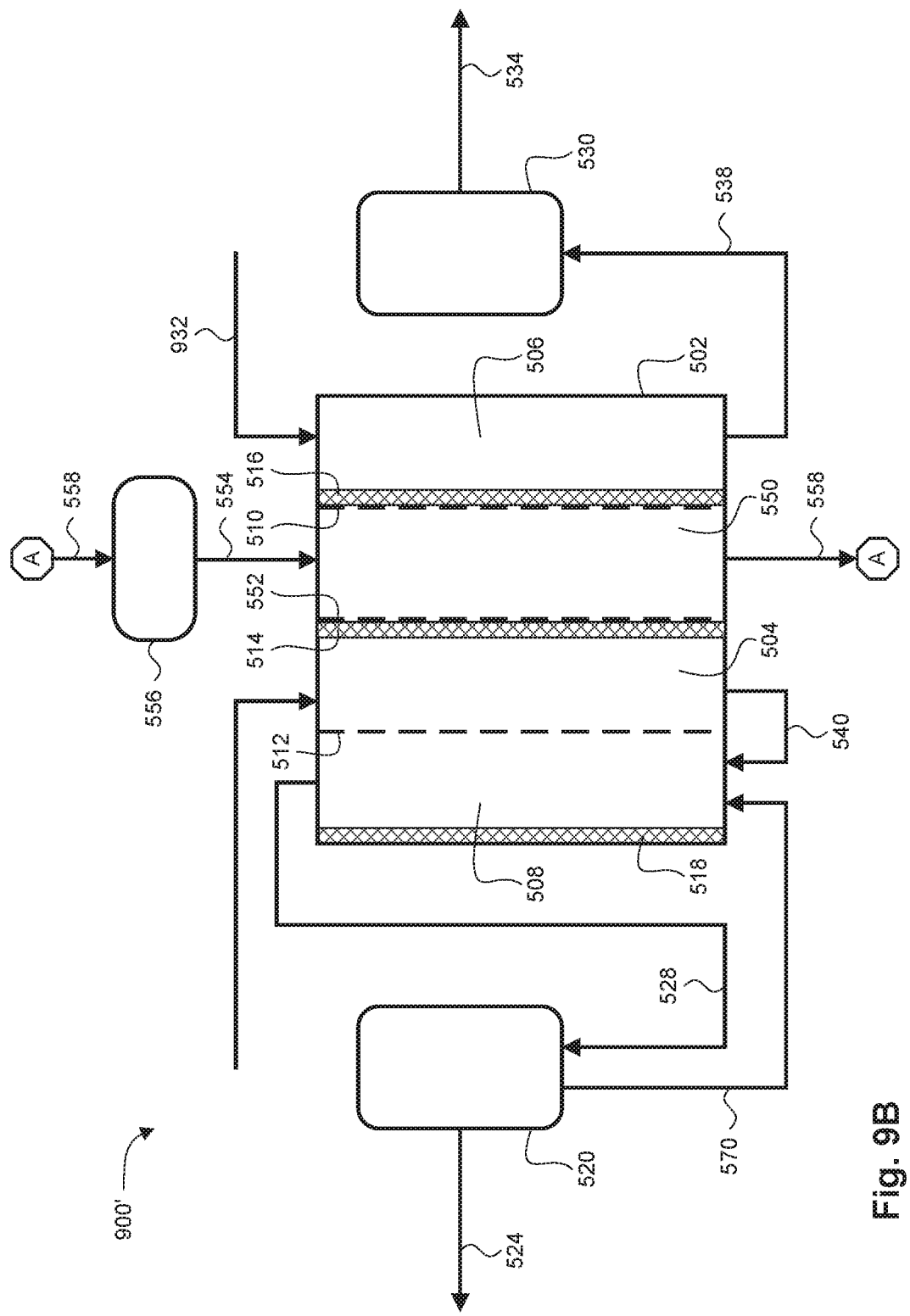

Depicted in FIG. 9B is an ECA system 900' that is a hybrid recirculating version of the ECA system 900 depicted in FIG. 9A. In particular, the ECA system 900' includes a neutralization recirculation path 570. The neutralization recirculation path 570 is configured to carry chlorine solution from the chlorine solution tank 520 back to the neutralization chamber 508. The chlorine solution can pass through the neutralization chamber 508 and then return to the chlorine solution tank 520 via the anode return line 528. The ECA system 900' is capable of passing water and brine through the anode chamber 504 one time, while passing the resulting chlorine solution through the neutralization chamber 508 multiple times. The effect of this is to raise the pH level of the chlorine solution even further than a single pass through the neutralization chamber 508 may raise the pH level of the chlorine solution.

One benefit to the embodiment shown in FIG. 9B is a low level of unreacted Cl⁻ that remains in the chloride solution. Because water passes through the anode chamber 504 only one time, there is only one opportunity for salt (NaCl) to diffuse from the brine into the water from the brine chamber 550 through the membrane 552. During normal operation, the reaction in the anode chamber 504 from the anode 514 is not completely efficient and the chlorine solution that leaves the anode chamber 504 will include some unreacted Cl⁻. As the amount of unreacted Cl⁻ increases, so too does the corrosiveness of the chlorine solution. This accumulation of unreacted Cl⁻ may occur in recirculation systems where the chlorine solution is recirculated back through the anode chamber 504. However, in the ECA system 900', the chlorine solution is not recirculated back through the anode chamber 504. The ECA system 900' does recirculate the chlorine solution back through the neutralization chamber 508 to gain the advantage of further increasing the pH of the chlorine solution, but the recirculation of the chlorine solution back through the neutralization chamber 508 does not increase the amount of unreacted Cl⁻ in the chlorine solution and even further reduces the amount of unreacted Cl⁻ by conversion to active chlorine. In this way, the chlorine solution produced by the ECA system 900' has a low level of corrosiveness, which reduces the effects of corrosion on the ECA system 900' itself and on anything that is cleaned using the chlorine solution.

Figure 10A:
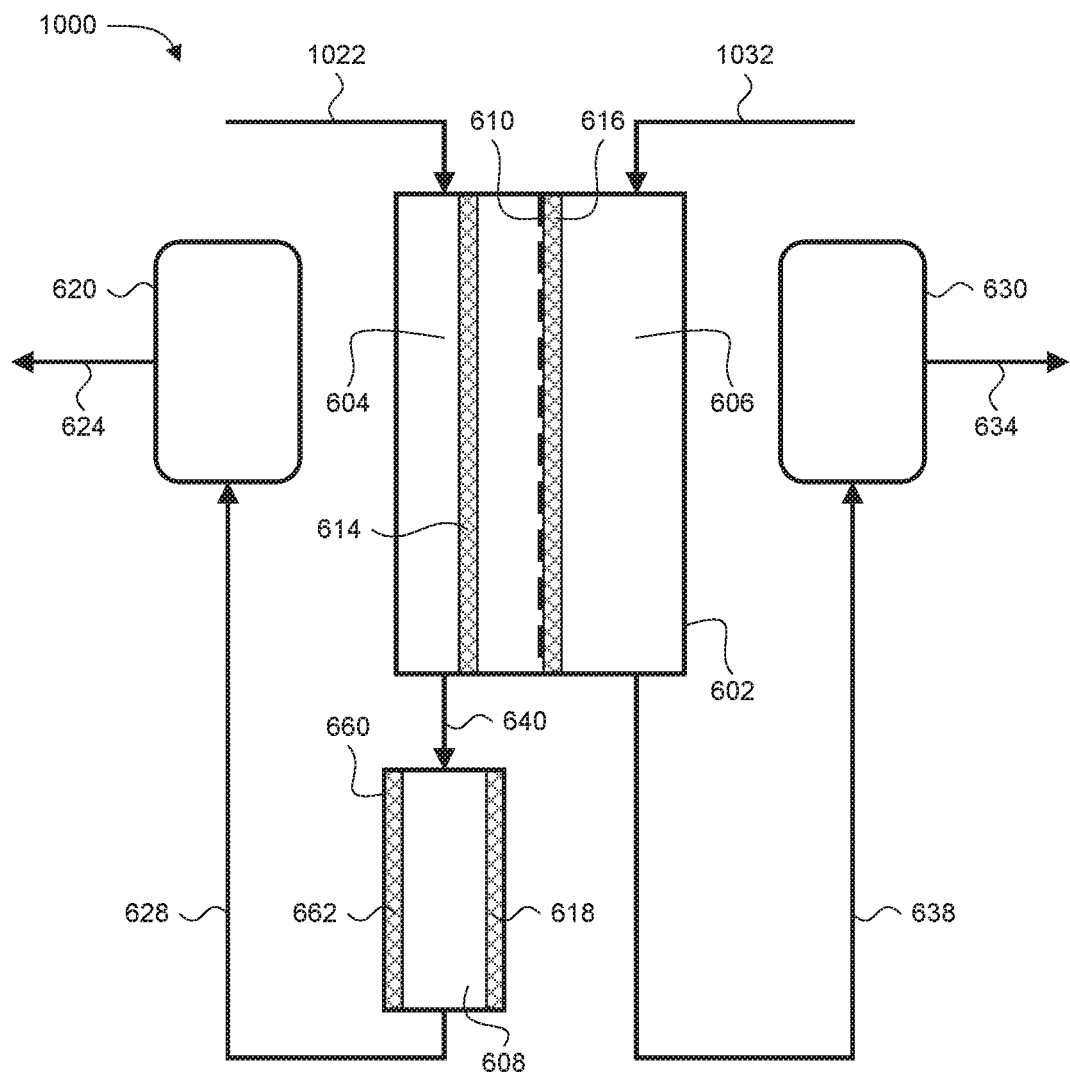

Depicted in FIG. 10A is a single-pass ECA system 1000 that is a variation of the ECA system 600 depicted in FIG. 6. The ECA system 1000 includes the chamber cell 602 that includes the anode chamber 604 and the cathode chamber 606. The anode chamber 604 is separated from the cathode chamber 606 by the membrane 610. The anode chamber 604 includes the anode 614 and the cathode chamber 606 includes the cathode 616. The ECA system 1000 also includes the neutralization cell 660. The neutralization cell 660 includes the neutralization chamber 608. The neutralization cathode 618 is located in the neutralization chamber 608. The neutralization anode 662 is also located in the neutralization chamber 608.

The ECA system 1000 also includes the chlorine solution tank 620. In contrast to the ECA system 600, the ECA system 1000 includes a brine supply line 1022 configured to carry brine from an external source (e.g., a brine tank) into the anode chamber 604. Similar to the ECA system 600, the chlorine solution supply line 624 is configured to carry chlorine solution out of the chlorine solution tank 620 to an external destination (e.g., a washing machine). The neutralization supply line 640 is configured to carry anodic electrolyte out of the anode chamber 604 to the neutralization chamber 608. The anode return line 628 is configured to carry anodic electrolyte out of the neutralization chamber 608 to the chlorine solution tank 620.

The ECA system 1000 also includes the alkaline solution tank 630. In contrast to the ECA system 600, the ECA system 1000 includes a water supply line 1032 configured to carry softened water from an external source (e.g., a water tank) into the cathode chamber 606. Similar to the ECA system 600, the alkaline solution supply line 634 is configured to carry alkaline solution from the alkaline solution tank 630 to an external destination (e.g., a washing machine). The cathode return line 638 is configured to carry cathodic electrolyte out of the cathode chamber 606 to the alkaline solution tank 630.

In some embodiments, portions of the ECA system 1000 are configured to operate in similar ways to their counterparts in the ECA system 600. In one example, recirculating anodic electrolyte is passed through the neutralization chamber 608 after it leaves the anode chamber 604 to maintain a pH level of the anodic electrolyte at a safe level (e.g., greater than about pH 4). In another example, water circulates from the alkaline solution tank 630 to the cathode chamber 606 to be converted to a cathodic electrolyte. In another example, the neutralization chamber 608 is not located in the chamber cell 602 where the anode chamber 604 and the cathode chamber 606 are located.

In the embodiment shown in FIG. 10A, the ECA system 1000 does not have a recirculation path for either the anodic electrolyte or cathodic electrolyte. Thus, the brine passes through the anode chamber 604 one time to form the anodic electrolyte (i.e., a dilute chlorine solution), but the anodic electrolyte is not cycled back through the anode chamber 604. Similarly, the water passes through the cathode chamber 606 one time to form the cathodic electrolyte (i.e., a dilute alkaline solution), but the cathodic electrolyte does not cycle back through the cathode chamber 606. Because the brine passes through the anode chamber 604 one time and the water passes through the cathode chamber 606 one time, the resulting chlorine solution and alkaline solution are not as concentrated as they would be if they were recirculated through the anode chamber 604 and the cathode chamber 606. This provides the ability to generate dilute alkaline and chlorine solutions on demand. In addition, the neutralization chamber 608 is configured to prevent the dilute chlorine solution from dropping down to pH levels where chlorine gas may form.

Figure 12H:
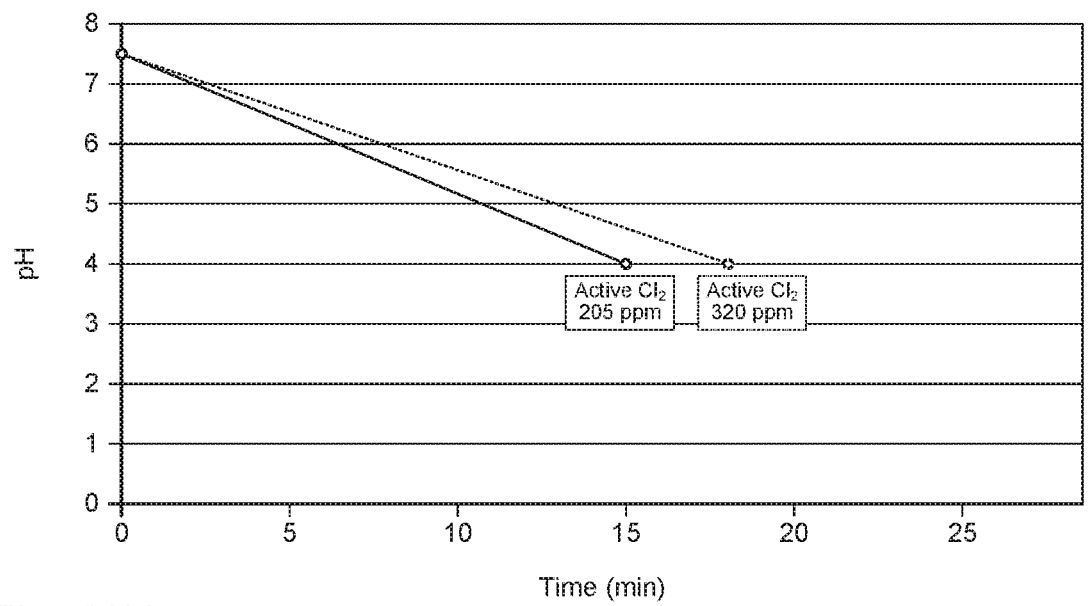

A test of the ECA system 1000 was performed and the results of the test are shown in Table 8 and the chart depicted in FIG. 12H. Because the ECA system 1000 is a single-pass system, the test of the ECA system 1000 includes two runs of the solution from pH 7.5 to pH 4.0: (1) a production-only run with the cathode 616 powered on and the neutralization cathode 618 powered off, and (2) a production and neutralization run with both of the cathodes 616 and 618 powered on. In the production-only run, the ECA system 1000 operated for 15 minutes before the pH level dropped to 4.0 and the concentration of active $Cl_2$ rose to 205 ppm. In the production and neutralization run, the ECA system 1000 operated for 18 minutes before the pH level dropped to 4.0 and the concentration of active $Cl_2$ rose to 320 ppm. Thus, activating the neutralization cathode 618 permitted an increase in the concentration of the active $Cl_2$ by 56.1% while increasing the time by only 20.0%.

TABLE 8

Anolyte (neutralization) test data using ECA system 1000

| | Cathode 616 Active Only | | Cathodes 616 and 618 Active | |
|---|---|---|---|---|
| Time (min) | pH | Active $Cl_2$ (ppm) | pH | Active $Cl_2$ (ppm) |
| 0 | 7.5 | (no data gathered) | 7.5 | (no data gathered) |
| 15 | 4.0 | 205 | — | — |
| 18 | — | — | 4.0 | 320 |

Figure 10B:
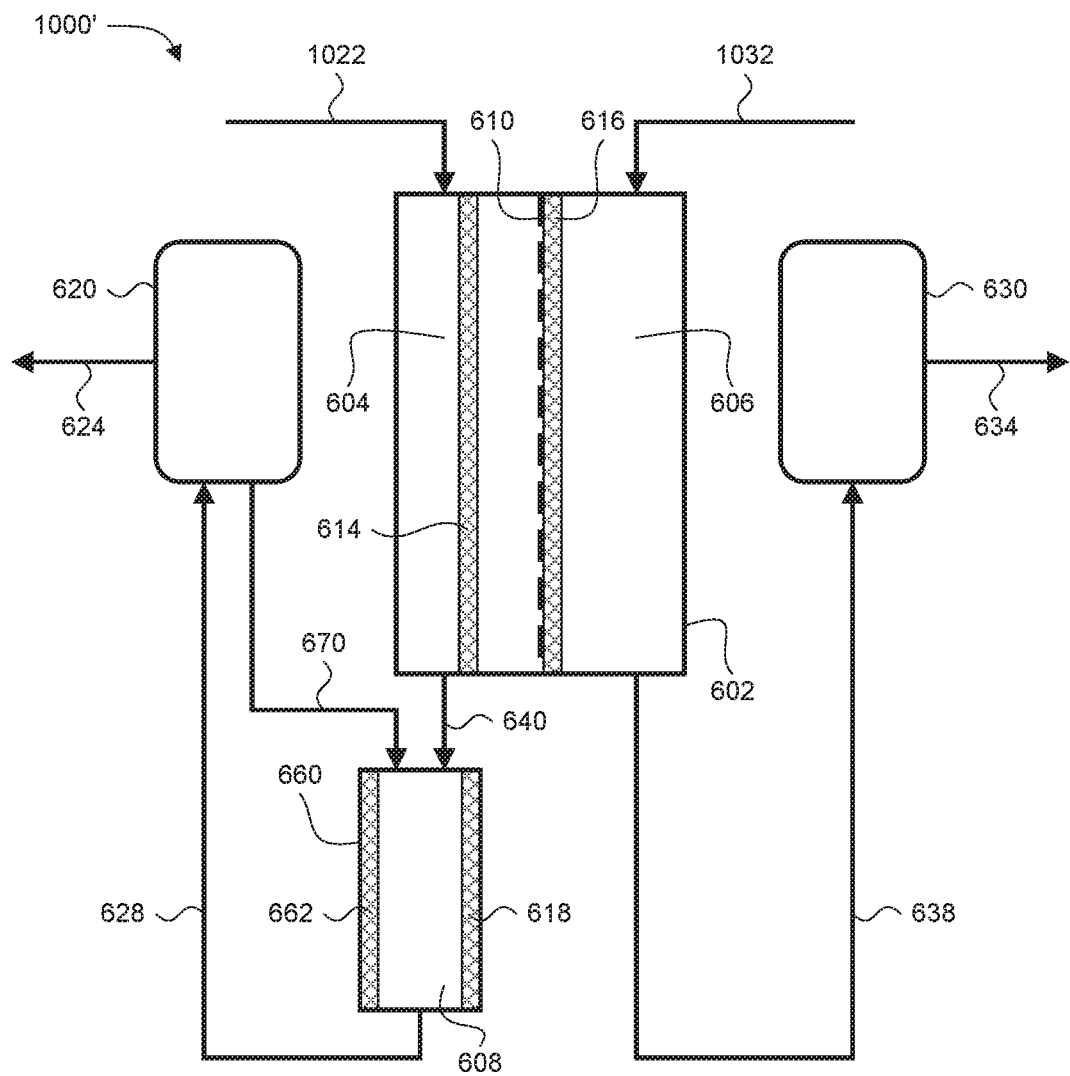

Depicted in FIG. 10B is an ECA system 1000' that is a hybrid recirculating version of the ECA system 1000 depicted in FIG. 10A. In particular, the ECA system 1000' includes a neutralization recirculation path 670. The neutralization recirculation path 670 is configured to carry chlorine solution from the chlorine solution tank 620 back to the neutralization chamber 608. The chlorine solution can pass through the neutralization chamber 608 and then return to the chlorine solution tank 620 via the anode return line 628. The ECA system 1000' is capable of passing water and brine through the anode chamber 604 one time, while passing the resulting chlorine solution through the neutralization chamber 608 multiple times. The effect of this is to raise the pH level of the chlorine solution even further than a single pass through the neutralization chamber 608 may raise the pH level of the chlorine solution.

Figure 11A:
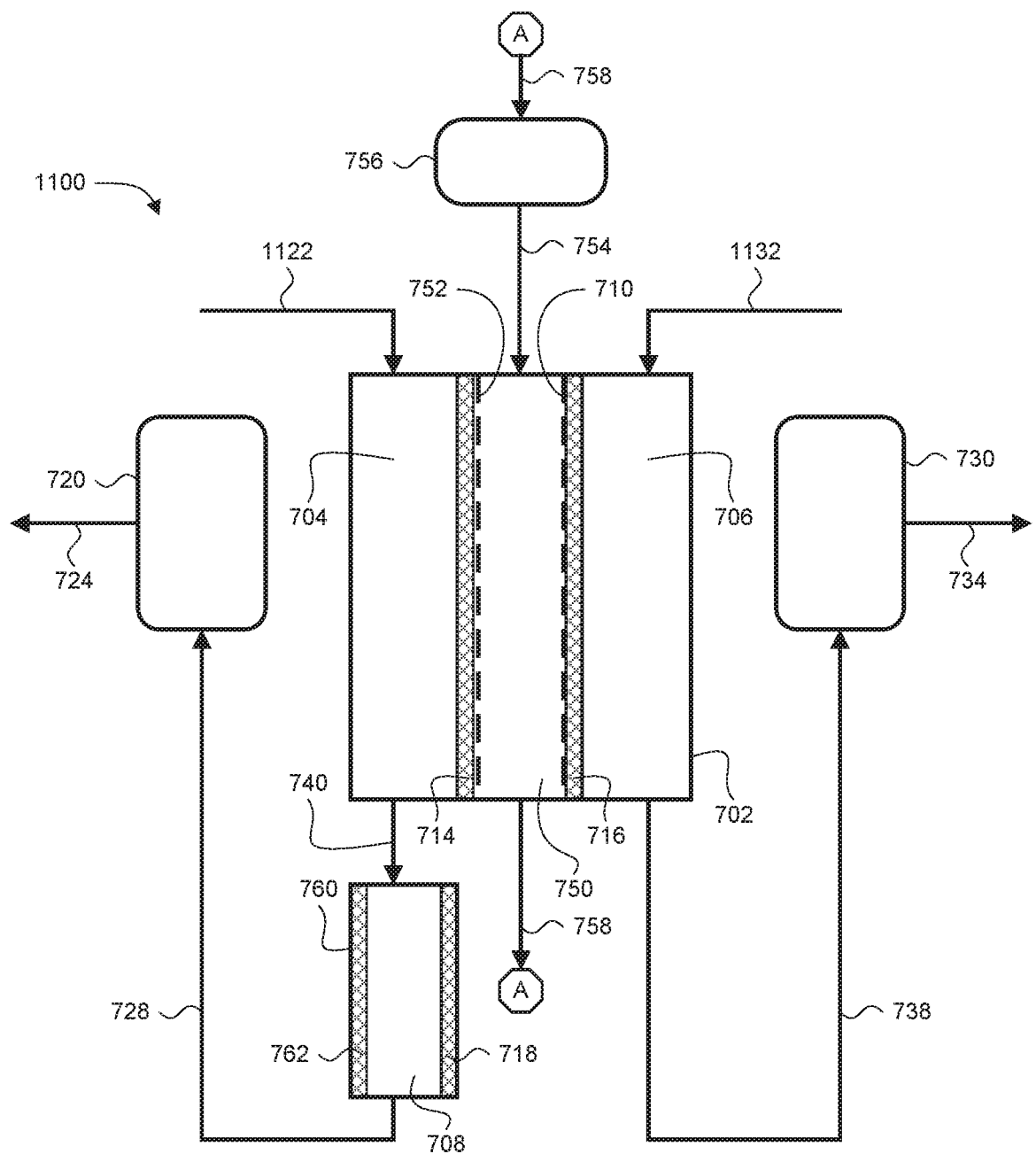

Depicted in FIG. 11A is a single-pass ECA system 1100 that is a variation of the ECA system 700 depicted in FIG. 7. The ECA system 1100 includes the chamber cell 702 that includes the anode chamber 704, the cathode chamber 706, and the brine chamber 750. The cathode chamber 706 is separated from the brine chamber 750 by the first membrane 710 and the anode chamber 704 is separated from the brine chamber 750 by the second membrane 752. The anode chamber 704 includes an anode 714 and the cathode chamber 706 includes the cathode 716. The ECA system 1100 also includes the neutralization cell 760 that includes the neutralization chamber 708. The neutralization anode 762 and the neutralization cathode 718 are located in the neutralization chamber 708.

The ECA system 1100 also includes the chlorine solution tank 720. In contrast to the ECA system 700, the ECA system 1100 includes a water supply line 1122 configured to carry raw or softened water from an external source (e.g., a water tank) into the anode chamber 704. Similar to the ECA system 700, the chlorine solution supply line 724 is configured to carry chlorine solution from the chlorine solution tank 720 to an external destination (e.g., a washing machine). The neutralization supply line 740 is configured to carry anodic electrolyte out of the anode chamber 704 to the neutralization chamber 708. The anode return line 728 is configured to carry anodic electrolyte out of the neutralization chamber 708 to the chlorine solution tank 720.

The ECA system 1100 also includes an alkaline solution tank 730. In contrast to the ECA system 700, the ECA system 1100 includes a water supply line 1132 configured to carry softened water from an external source (e.g., a water tank) into the cathode chamber 706. Similar to the ECA system 700, the alkaline solution supply line 734 is configured to carry alkaline solution out of the alkaline solution tank 730 to an external destination (e.g., a washing machine). The cathode return line 738 is configured to carry cathodic electrolyte out of the cathode chamber 706 to the alkaline solution tank 730.

The ECA system 1100 also includes the brine supply line 754 configured to carry brine from the external brine tank 756 into the brine chamber 750. The brine return line 758 is configured to remove brine from the brine chamber 750. In some embodiments, the brine return line 758 is configured to carry brine out of the brine chamber 750 and return it to the external brine tank 756. This allows the brine to circulate from the external brine tank 756, through the brine chamber 750, and back to the external brine tank 756. As the brine flows through the brine chamber 750, the second membrane 752 permits $Cl^-$ from the brine to pass from the brine chamber 750 into the anode chamber 704. The $Cl^-$ in the anode chamber 704 is converted to hypochlorous acid according to the anode half-cell reaction (1). In this way, hypochlorous acid in generated in the anode chamber 704 without introducing brine into the chlorine solution tank 720.

In some embodiments, portions of the ECA system 1100 are configured to operate in similar ways to their counterparts in the ECA system 700. In one example, anodic electrolyte is passed through the neutralization chamber 708 after it leaves the anode chamber 704 to maintain a pH level of the anodic electrolyte at a safe level. In another example, water passes through the cathode chamber 706 to be converted to a cathodic electrolyte. In another example, the neutralization chamber 708 is not located in the chamber cell 702 where the anode chamber 704 and the cathode chamber 706 are located.

In the embodiment shown in FIG. 11A, the ECA system 1100 does not have a recirculation path for either the anodic electrolyte or cathodic electrolyte. Thus, the water passes through the anode chamber 704 one time to form the anodic electrolyte (i.e., a dilute chlorine solution) with the $Cl^-$ that passes through the second membrane 752, but the anodic electrolyte is not cycled back through the anode chamber 704. Similarly, the water passes through the cathode chamber 706 one time to form the cathodic electrolyte (i.e., a dilute alkaline solution), but the cathodic electrolyte does not cycle back through the cathode chamber 706. Because the anodic electrolyte is not recirculated through the anode chamber 704 and the water passes through the cathode chamber 606 one time, the resulting chlorine solution and alkaline solution are not as concentrated as they would be if they were recirculated through the anode chamber 704 and the cathode chamber 706. This provides the ability to generate dilute alkaline and chlorine solutions on demand. In addition, the neutralization chamber 708 is configured to prevent the dilute chlorine solution from dropping down to pH levels where chlorine gas may form.

Figure 12I:
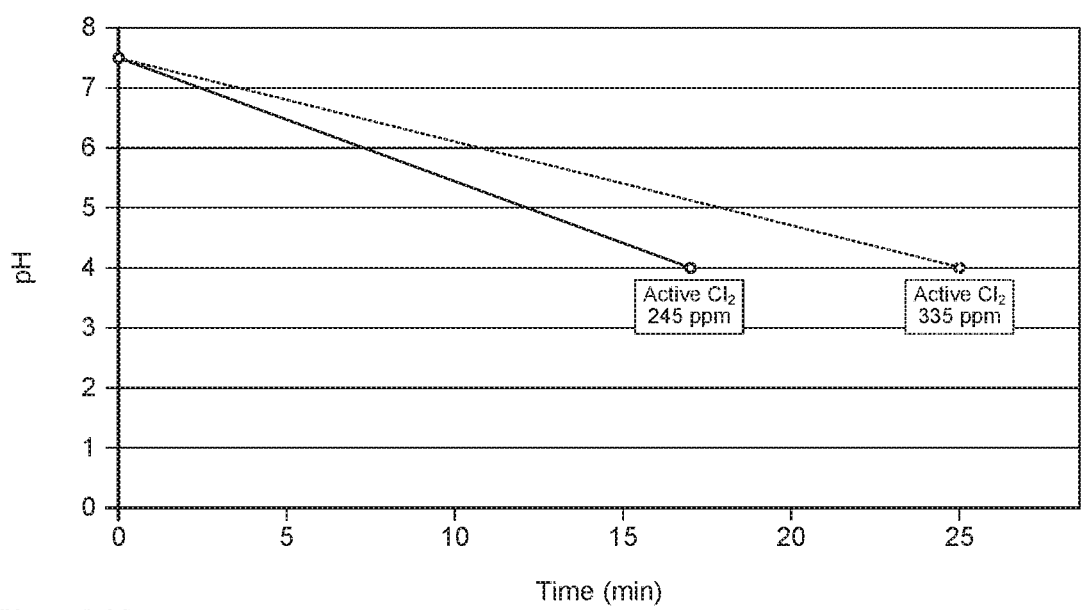

A test of the ECA system 1100 was performed and the results of the test are shown in Table 9 and the chart depicted in FIG. 12I. Because the ECA system 1100 is a single-pass system, the test of the ECA system 1100 includes two runs of the solution from pH 7.5 to pH 4.0: (1) a production-only run with the cathode 716 powered on and the neutralization cathode 718 powered off, and (2) a production and neutralization run with both of the cathodes 716 and 718 powered on. In the production-only run, the ECA system 1100 operated for 17 minutes before the pH level dropped to 4.0 and the concentration of active $Cl_2$ rose to 245 ppm. In the production and neutralization run, the ECA system 1100 operated for 25 minutes before the pH level dropped to 4.0 and the concentration of active $Cl_2$ rose to 335 ppm. Thus, activating the neutralization cathode 718 permitted an increase in the concentration of the active $Cl_2$ by 36.7% while increasing the time by 47.1%.

TABLE 9

Anolyte (neutralization) test data using ECA system 1100

| | Cathode 716 Active Only | | Cathodes 716 and 718 Active | |
|---|---|---|---|---|
| Time (min) | pH | Active $Cl_2$ (ppm) | pH | Active $Cl_2$ (ppm) |
| 0 | 7.5 | (no data gathered) | 7.5 | (no data gathered) |
| 17 | 4.0 | 245 | — | — |
| 25 | — | — | 4.0 | 335 |

Figure 11B:
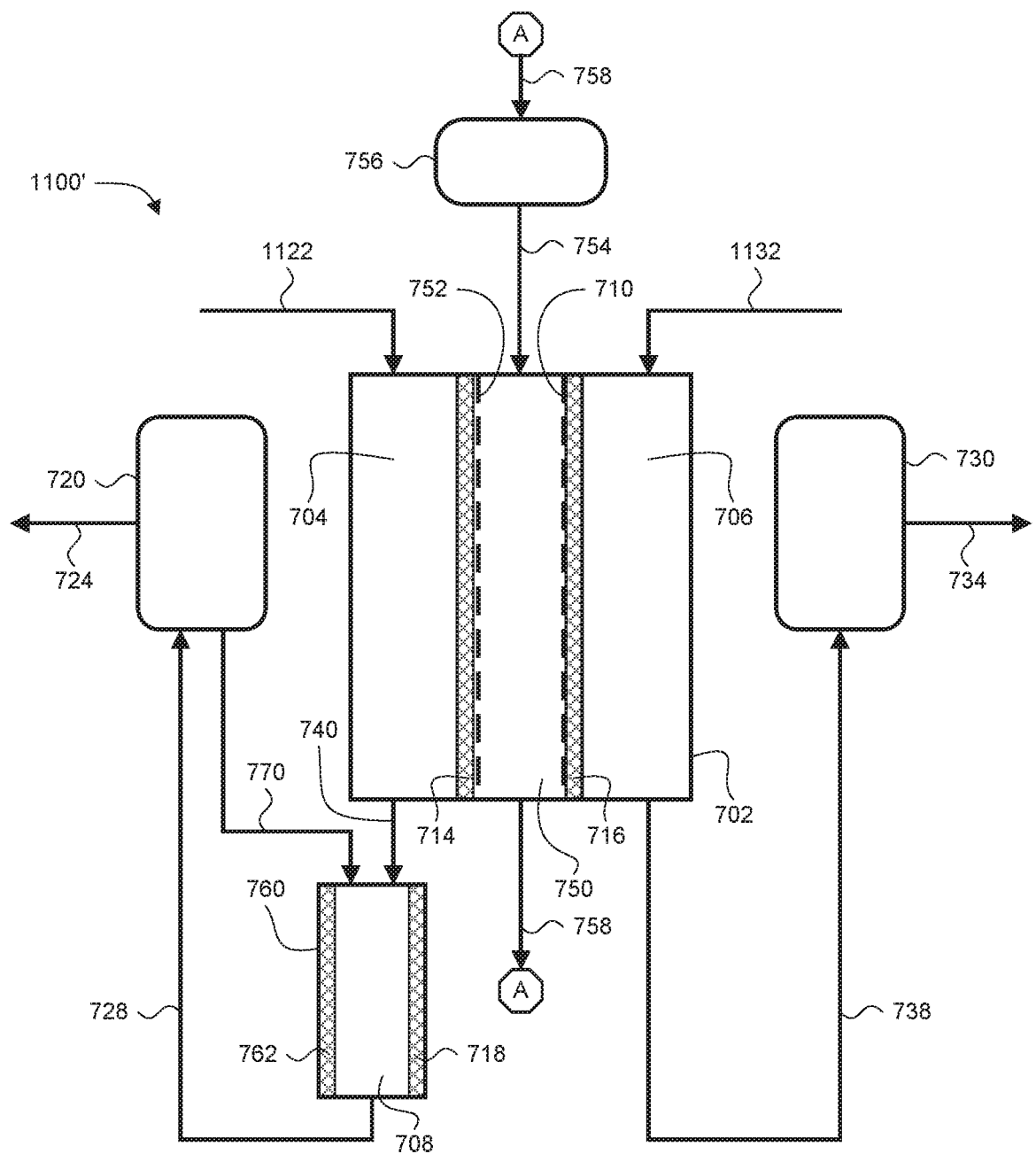

Depicted in FIG. 11B is an ECA system 1100' that is a hybrid recirculating version of the ECA system 1100 depicted in FIG. 11A. In particular, the ECA system 1100' includes a neutralization recirculation path 770. The neutralization recirculation path 770 is configured to carry chlorine solution from the chlorine solution tank 720 back to the neutralization chamber 708. The chlorine solution can pass through the neutralization chamber 708 and then return to the chlorine solution tank 720 via the anode return line 728. The ECA system 1100' is capable of passing water and brine through the anode chamber 704 one time, while passing the resulting chlorine solution through the neutralization chamber 708 multiple times. The effect of this is to raise the pH level of the chlorine solution even further than a single pass through the neutralization chamber 708 may raise the pH level of the chlorine solution.

One benefit to the embodiment shown in FIG. 11B is a low level of unreacted $Cl^-$ that remains in the chloride solution. Because water passes through the anode chamber 704 only one time, there is only one opportunity for salt (NaCl) to diffuse from the brine into the water from the brine chamber 750 through the membrane 752. During normal operation, the reaction in the anode chamber 704 from the anode 714 is not completely efficient and the chlorine solution that leaves the anode chamber 704 will include some unreacted $Cl^-$. As the amount of unreacted $Cl^-$ increases, so too does the corrosiveness of the chlorine solution. This accumulation of unreacted $Cl^-$ may occur in recirculation systems where the chlorine solution is recirculated back through the anode chamber 704. However, in the ECA system 1100', the chlorine solution is not recirculated back through the anode chamber 704. The ECA system 1100' does recirculate the chlorine solution back through the neutralization chamber 708 to gain the advantage of further increasing the pH of the chlorine solution, but the recirculation of the chlorine solution back through the neutralization chamber 708 does not increase the amount of unreacted $Cl^-$ in the chlorine solution and even further reduces the amount of unreacted $Cl^-$ by conversion to active chlorine. In this way, the chlorine solution produced by the ECA system 1100' has a low level of corrosiveness, which reduces the effects of corrosion on the ECA system 1100' itself and on anything that is cleaned using the chlorine solution.

For purposes of this disclosure, terminology such as "upper," "lower," "vertical," "horizontal," "inwardly," "outwardly," "inner," "outer," "front," "rear," and the like, should be construed as descriptive and not limiting the scope of the claimed subject matter. Further, the use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Unless stated otherwise, the terms "substantially," "approximately," and the like are used to mean within 5% of a target value.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

What is claimed is:

1. An electro-chemical activation (ECA) system, comprising:
    a chamber cell comprising
        an anode chamber comprising an anode, wherein the anode is configured to convert water having an alkaline-metal chloride into an anodic electrolyte comprising protons and hypochlorous acid;
        a cathode chamber comprising a cathode, wherein the cathode is configured to convert water into a cathodic electrolyte; and
        a first membrane separating the anode chamber from the cathode chamber; and
    a neutralization cell separate from the chamber cell, the neutralization cell comprising
        a neutralization chamber in fluid communication with the anode chamber, the neutralization chamber comprising a neutralization cathode and a neutralization anode, wherein the neutralization chamber is configured to neutralize the protons of the anodic electrolyte and increase a pH level of the anodic electrolyte from the anode chamber while increasing a concentration of the hypochlorous acid,
    wherein the ECA system is configured to recirculate the anodic electrolyte back through the anode chamber and the neutralization chamber multiple times to produce a concentrated chlorine solution; and wherein the ECA system is further configured to recirculate the cathodic electrolyte back through the cathode chamber multiple times to produce a concentrated alkaline solution,
    wherein the ECA system further comprises an electronic controller configured to receive an indication of the pH level of the anodic electrolyte and to control power to the cathode and the neutralization cathode based on the indication of the pH level of the anodic electrolyte so as to perform operations comprising
        operating the ECA system in a production mode to generate the anodic electrolyte comprising the protons and the hypochlorous acid;

operating the ECA system in a neutralization mode to increase the pH level of the anodic electrolyte while increasing the concentration of the hypochlorous acid; and alternating operation between the production mode and the neutralization mode.

2. The ECA system of claim 1, further comprising:

a neutralization recirculation path configured to recirculate at least a portion of the anodic electrolyte back through the neutralization chamber.

3. An electro-chemical activation (ECA) system, comprising:

a chamber cell comprising an anode chamber comprising an anode, wherein the anode is configured to convert water having an alkaline-metal chloride into an anodic electrolyte comprising protons and hypochlorous acid;

a cathode chamber comprising a cathode, wherein the cathode is configured to convert water into a cathodic electrolyte; and a first membrane separating the anode chamber from the cathode chamber; and a neutralization cell separate from the chamber cell, the neutralization cell comprising a neutralization chamber in fluid communication with the anode chamber, the neutralization chamber comprising a neutralization cathode and a neutralization anode, wherein the neutralization chamber is configured to neutralize the protons of the anodic electrolyte and increase a pH level of the anodic electrolyte from the anode chamber while increasing a concentration of the hypochlorous acid, wherein the ECA system is configured to recirculate the anodic electrolyte back through the anode chamber and the neutralization chamber multiple times to produce a concentrated chlorine solution; and wherein the ECA system is further configured to recirculate the cathodic electrolyte back through the cathode chamber multiple times to produce a concentrated alkaline solution; and wherein the first membrane is configured to hinder the migration of between the anode chamber and the cathode chamber.

4. An electro-chemical activation (ECA) system, comprising:

a chamber cell comprising an anode chamber comprising an anode, wherein the anode is configured to convert water having an alkaline-metal chloride into an anodic electrolyte comprising protons and hypochlorous acid;

a cathode chamber comprising a cathode, wherein the cathode is configured to convert water into a cathodic electrolyte; and a first membrane separating the anode chamber from the cathode chamber; and a neutralization cell separate from the chamber cell, the neutralization cell comprising a neutralization chamber in fluid communication with the anode chamber, the neutralization chamber comprising a neutralization cathode and a neutralization anode, wherein the neutralization chamber is configured to neutralize the protons of the anodic electrolyte and increase a pH level of the anodic electrolyte from the anode chamber while increasing a concentration of the hypochlorous acid, wherein the ECA system is configured to recirculate the anodic electrolyte back through the anode chamber and the neutralization chamber multiple times to produce a concentrated chlorine solution; and wherein the ECA system is further configured to recirculate the cathodic electrolyte back through the cathode chamber multiple times to produce a concentrated alkaline solution; and wherein the cathode is located in the cathode chamber in direct contact with the first membrane.

5. The ECA system of claim 3, wherein a ratio of exposed surface area of the neutralization anode in the neutralization chamber to exposed surface area of the neutralization cathode in the neutralization chamber is in a range from about 1:1 to about 1:10,000.

6. The ECA system of claim 3, further comprising:

a brine chamber located in the chamber cell between the anode chamber and the cathode chamber, wherein the brine chamber and the cathode chamber are separated by the first membrane, and wherein the brine chamber and the anode chamber are separated by a second membrane.

7. The ECA system of claim 6, wherein the second membrane is configured to permit migration of Cl⁻ from the brine chamber to the anode chamber.

8. The ECA system of claim 7, wherein the second membrane is further configured to hinder the migration of sodium between the brine chamber and the anode chamber.

9. The ECA system of claim 6, wherein the ECA system is configured to cycle brine through the brine chamber.

10. The ECA system of claim 3, further comprising:

an electronic controller configured to receive an indication of the pH level of the anodic electrolyte and further configured to control one or more of power to or activation time of the cathode and the neutralization cathode based on the indication of the pH level of the anodic electrolyte.

11. The ECA system of claim 10, wherein the electronic controller is further configured to control one or more of recirculation of the anodic electrolyte by the ECA system, recirculation of the cathodic electrolyte by the ECA system, dispensing of the concentrated chlorine solution from the ECA system, or dispensing of the concentrated alkaline solution from the ECA system.

12. A method of using the ECA system of claim 1, the method comprising:

adding brine to the ECA system;

adding water to the ECA system;

circulating the brine through the anode chamber and the neutralization chamber multiple times to produce the concentrated chlorine solution, wherein the concentrated chlorine solution has a pH level in a range from about pH 4 to about pH 8; and circulating the water through the cathode chamber multiple times to produce the concentrated alkaline solution.

13. The method of claim 12, wherein the concentrated chlorine solution has a pH level in a range from about pH 4 to about pH 6.

14. The method of claim 12, wherein the concentrated chlorine solution has a concentration in a range from about 0.02% to about 14%.

15. The method of claim 14 further comprising dispensing the concentrated chlorine solution to a washing machine, and wherein the washing machine is configured to dilute the concentrated chlorine solution from the range from about 0.02% to about 14% to a range from about 15 ppm to about 60 ppm.

16. The method of claim 12, wherein the concentrated alkaline solution has an alkalinity in a range from about 0.02% $Na_2O$ to about 50% $Na_2O$.

17. A method of operating the ECA system of claim 1, the method comprising
- operating the ECA system in the production mode to generate the anodic electrolyte comprising the protons and the hypochlorous acid;
- operating the ECA system in the neutralization mode to increase the pH level of the anodic electrolyte while increasing the concentration of the hypochlorous acid; and
- alternating operation between the production mode and the neutralization mode to remain at or above about pH 4 while increasing the concentration of the hypochlorous acid.

18. The method of claim 17, wherein the alternating operation between the production mode and the neutralization mode keeps the pH level of the anodic electrolyte within a range of between about 4 and about 7.

19. The ECA system of claim 1, wherein in the production mode, power to the cathode is on and power to the neutralization cathode is on, and in the neutralization mode, the power to the cathode is off and power to the neutralization cathode is on.

\* \* \* \* \*

UNITED STATES PATENT AND TRADEMARK OFFICE
CERTIFICATE OF CORRECTION

| | | |
|---|---|---|
| PATENT NO. | : 11,326,261 B2 | Page 1 of 1 |
| APPLICATION NO. | : 16/302208 | |
| DATED | : May 10, 2022 | |
| INVENTOR(S) | : Jan E. Veening | |

It is certified that error appears in the above-identified patent and that said Letters Patent is hereby corrected as shown below:

On the Title Page

<u>Item (71):</u>
Delete the phrase "Applicant: Diversey, Inc., Charlotte, NC (US)" and replace with --Applicant: Diversey, Inc., Fort Mill, SC (US)--.

Signed and Sealed this
First Day of October, 2024

Katherine Kelly Vidal
*Director of the United States Patent and Trademark Office*